(12) United States Patent
Swift

(10) Patent No.: US 10,664,809 B2
(45) Date of Patent: May 26, 2020

(54) OBSERVATION BASED EVENT TRACKING

(71) Applicant: Crown Equipment Corporation, New Bremen, OH (US)

(72) Inventor: Philip W. Swift, Oakwood, OH (US)

(73) Assignee: Crown Equipment Corporation, New Bremen, OH (US)

(*) Notice: Subject to any disclaimer, the term of this patent is extended or adjusted under 35 U.S.C. 154(b) by 0 days.

(21) Appl. No.: 16/544,014

(22) Filed: Aug. 19, 2019

(65) Prior Publication Data

US 2019/0370756 A1  Dec. 5, 2019

Related U.S. Application Data

(62) Division of application No. 15/685,135, filed on Aug. 24, 2017, now Pat. No. 10,423,933.

(Continued)

(51) Int. Cl.
*G06Q 10/10* (2012.01)
*H04W 4/029* (2018.01)
(Continued)

(52) U.S. Cl.
CPC ........ *G06Q 10/1097* (2013.01); *G06Q 10/06* (2013.01); *G06Q 10/0639* (2013.01);
(Continued)

(58) Field of Classification Search
CPC .................................. G06F 1/00; G06Q 10/00
See application file for complete search history.

(56) References Cited

U.S. PATENT DOCUMENTS

2003/0227386 A1* 12/2003 Pulkkinen ............. A61B 5/1113
340/573.1
2014/0249891 A1* 9/2014 Olguin Olguin .. G06Q 10/0639
705/7.38

(Continued)

FOREIGN PATENT DOCUMENTS

GB           2513958 A       11/2014

OTHER PUBLICATIONS

Agnes Wittmann-Regis; International Preliminary Report on Patentability; International Application No. PCT/US2017/048347; dated Mar. 7, 2019; International Bureau of WIPO; Geneva, Switzerland.

(Continued)

*Primary Examiner* — Shirley Lu
(74) *Attorney, Agent, or Firm* — Stevens & Showalter LLP

(57) ABSTRACT

A computer-implemented process of tracking events, is carried out by detecting that a first badge is within a personal-area network wireless communication range of a second badge, thus designating an encounter, and performing, by processor executing instructions read out from memory, an event logging transaction responsive to the encounter. The event logging transaction is performed by receiving, from the first badge, an electronic message characterizing an observation made by the user of the first badge relative to a user of the second badge, converting the electronic message received from the first badge into a pinpoint response, and generating an event record comprising an identification of an event type, and the pinpoint response.

10 Claims, 10 Drawing Sheets

Related U.S. Application Data

(60) Provisional application No. 62/379,724, filed on Aug. 25, 2016.

(51) Int. Cl.
| | | |
|---|---|---|
| *G06Q 10/06* | (2012.01) | |
| *H04W 4/02* | (2018.01) | |
| *G08B 21/18* | (2006.01) | |
| *G08B 25/10* | (2006.01) | |
| *G06F 16/951* | (2019.01) | |
| *H04W 4/44* | (2018.01) | |
| *H04W 4/80* | (2018.01) | |
| *H04W 4/40* | (2018.01) | |
| *G06Q 50/00* | (2012.01) | |

(52) U.S. Cl.
CPC ... *G06Q 10/063114* (2013.01); *G08B 21/182* (2013.01); *G08B 25/10* (2013.01); *H04W 4/02* (2013.01); *H04W 4/029* (2018.02); *G06F 16/951* (2019.01); *G06Q 50/01* (2013.01); *H04W 4/40* (2018.02); *H04W 4/44* (2018.02); *H04W 4/80* (2018.02)

(56) References Cited

U.S. PATENT DOCUMENTS

| | | |
|---|---|---|
| 2015/0064668 A1 | 3/2015 | Manci et al. |
| 2016/0125348 A1 | 5/2016 | Dyer et al. |
| 2018/0060831 A1 | 3/2018 | Swift |

OTHER PUBLICATIONS

Turkeli, Yasemin; International Search Report and Written Opinion; International Application No. PCT/US2017/048347; dated Nov. 10, 2017; European Patent Office; Rijswijk, Netherlands.

Lu, Shirley; Notice of Allowance; U.S. Appl. No. 15/685,135; dated May 15, 2019; United States Patent and Trademark Office; Alexandria, VA.

\* cited by examiner

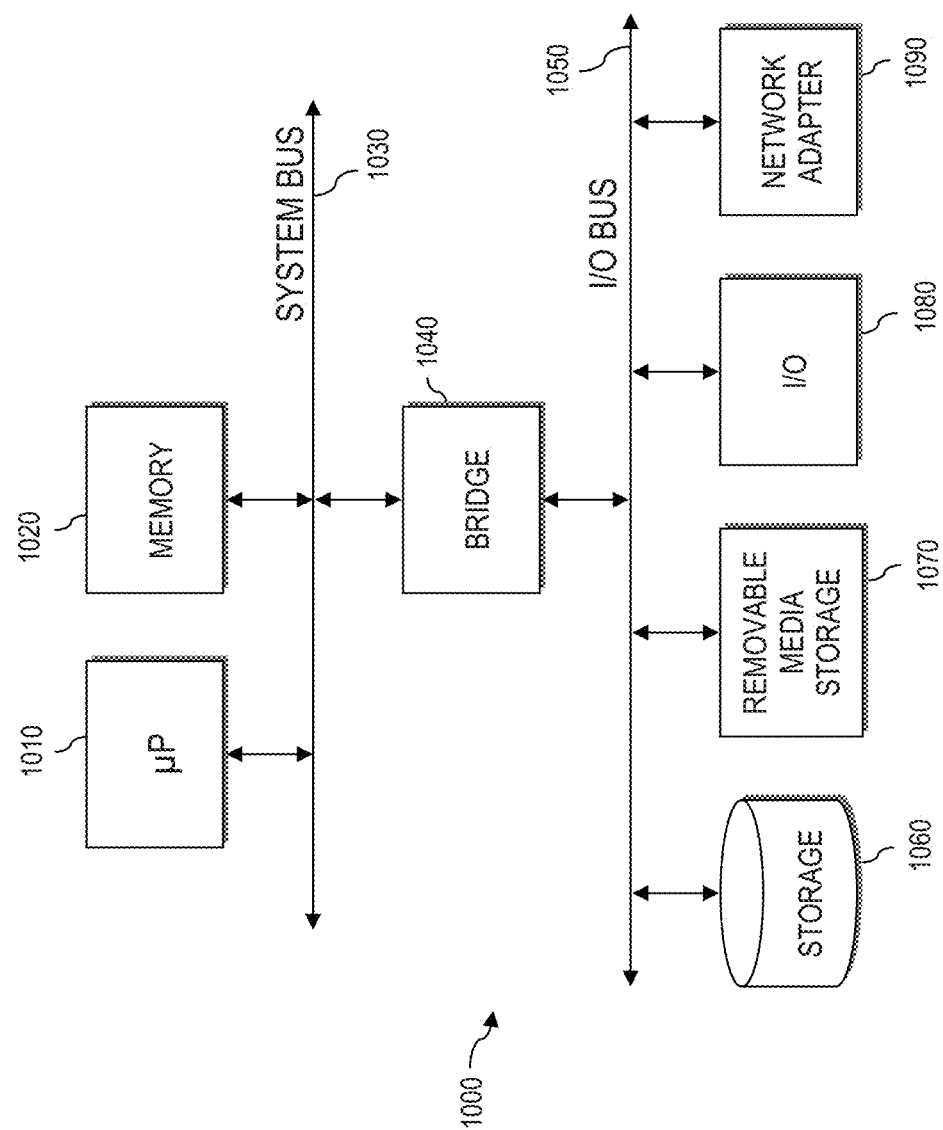

OBSERVATION BASED EVENT TRACKING

CROSS REFERENCE TO RELATED APPLICATIONS

This application is a divisional application of U.S. patent application Ser. No. 15/685,135, filed Aug. 24, 2017, entitled OBSERVATION BASED EVENT TRACKING, now allowed, which claims the benefit of U.S. Provisional Patent Application Ser. No. 62/379,724, filed Aug. 25, 2016, entitled OBSERVATION BASED EVENT TRACKING, the disclosures of which are hereby incorporated herein by reference.

BACKGROUND

The present disclosure relates to electronic systems that collect information related to the operation and movement of electronic badges in industrial applications, and in particular to the utilization of user-based observational feedback for event tracking.

Wireless strategies are deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

For instance, in a typical warehouse implementation, a forklift truck is equipped with a communications device that links a corresponding forklift truck operator to a management system executing on an associated computer enterprise via a wireless transceiver. Essentially, the communications device is used as an interface to the management system to direct the tasks of the forklift truck operator, e.g., by instructing the forklift truck operator where and/or how to pick, pack, put away, move, stage, process or otherwise manipulate items within a facility.

BRIEF SUMMARY

According to aspects of the present disclosure, a computer-implemented process of tracking events comprises detecting, by a first electronic badge, the presence of a second electronic badge that is within a wireless communication range of the first electronic badge, thus designating an encounter. The computer-implemented process also comprises performing, by a processor executing instructions read out from memory, an event logging transaction in response to the encounter. The event logging transaction is performed by identifying an event type associated with the second electronic badge, and identifying an electronic pinpoint that is linked to the identified event type. Here, the identified pinpoint specifies an observable characteristic associated with the event type. The event logging transaction also comprises outputting a prompt to a user of the first electronic badge that is associated with the identified electronic pinpoint. The event logging transaction yet further comprises receiving, by the first electronic badge, from the user of the first electronic badge, an electronic acknowledgement that a user of the second electronic badge has engaged in an occurrence of the identified event type, and receiving, by the first electronic badge, from the user of the first electronic badge, a response to the identified pinpoint. The event logging transaction still further comprises wirelessly communicating an event record to a remote server, the event record comprising an identification of the event type, and the response to the pinpoint.

According to yet further aspects of the present disclosure, a computer-implemented process of tracking events comprises detecting, by a first electronic badge, the presence of a second electronic badge that is within a wireless communication range of the first electronic badge. The computer-implemented process also comprises performing, by a processor executing on the first electronic badge, an event logging transaction in response to detecting the presence of the second electronic badge. The event logging transaction is performed by identifying an event type associated with the second electronic badge by receiving a geo-record of electronically recorded events associated with the second badge within a corresponding geo-zone and selecting an electronically recorded event as the event type. The computer-implemented process further comprises identifying an electronic pinpoint that is linked to the identified event type. Here, the identified pinpoint is based upon the geo-record and specifies an observable characteristic associated with the event type. The event logging transaction further comprises outputting a prompt to a user of the first electronic badge that is associated with the identified electronic pinpoint, and receiving, by the first electronic badge, from the user of the first electronic badge, an electronic acknowledgement that a user of the second electronic badge has engaged in an occurrence of the identified event type. The event logging transaction yet further comprises receiving, by the first electronic badge, from the user of the first electronic badge, a response to the identified pinpoint, wirelessly transmitting a message to the second electronic badge indicating that an observation was made and wirelessly communicating an event record to a remote server, the event record comprising an identification of the event type, and the response to the pinpoint.

BRIEF DESCRIPTION OF THE SEVERAL VIEWS OF THE DRAWINGS

FIG. 10 is a block diagram of a computer processing system capable of implementing any of the systems and/or processes (or subsets thereof) described more fully herein.

DETAILED DESCRIPTION

Figure 1:
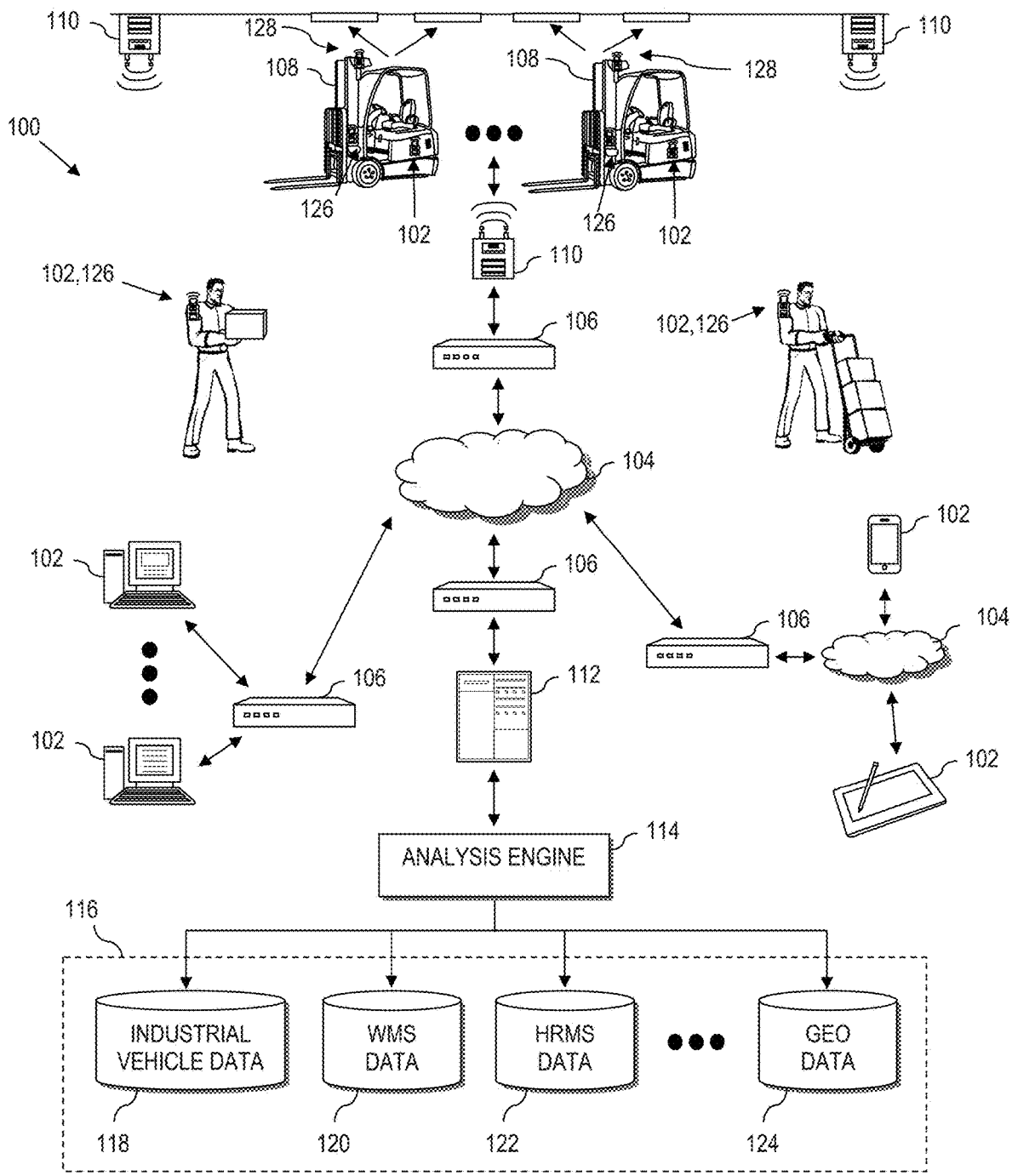
FIG. 1 is a block diagram of an industrial system, according to aspects of the disclosure.

According to various aspects of the present disclosure, systems and computer-implemented processes provide communication capabilities between electronic badges operating in an industrial environment, e.g., a constrained environment such as a warehouse, a manufacturing environment, a commercial operation, etc. This enables an infrastructure for implementing user-based observational feedback, such as for event tracking.

As an introductory and non-limiting example, a first worker, e.g., a pedestrian, can detect a second worker, e.g., forklift operator, follow a proper procedure, e.g., make eye contact at an end of an aisle. The first worker interacts with their electronic badge to record the observation. In practice, the observation can be fed back to the electronic badge of the forklift operator. Also, the observation can be used to augment, modify, enhance, complete, aggregate with, etc., one or more operational generated event records, e.g., data recorded by data logging capabilities of the forklift truck. In this regard, the electronics on the forklift may be able to detect that the forklift operator stopped and sounded the horn at the end of the aisle. However, the electronics on the forklift are unable to detect that the forklift operator made eye contact with a nearby pedestrian. However, this data is collected by the electronic badges via the pedestrian implementing observational feedback. In this manner, data is collected that could not otherwise be obtained by sensors alone, resulting in more complete event records than could otherwise be generated. Moreover, automated control, e.g., of industrial vehicles, machines, electronic badges, etc., can be implemented based upon data from sensors, and from dynamically generated observation and feedback. Many other details and features are described more fully herein.

The disclosure herein improves technologies of wireless communication between industrial workers, wireless communication between pedestrians and operators of industrial vehicles, person-to-machine wireless communication, machine-to-machine wireless communication, and electronic detection and collection of events in proximity to, or otherwise associated with, electronic badges.

In particular, various aspects of the present disclosure address the technical problem of event detection and responsiveness. The present disclosure provides a technical solution that utilizes wireless communication between electronic badges to generate events based upon observational data, which is enabled via temporary, wireless communication networks (e.g., personal-area networks). The present disclosure also provides a technical solution that comprises augmenting electronic operational data automatically collected via a data logging operation, with localized short-range wireless communication between electronic badges to electronically collect observational data. The electronically collected observational data can be used to corroborate, augment, modify, combine with, aggregate alongside with, or otherwise be processed with the collected operational data for event detection and responsiveness actions.

According to yet further aspects of the present disclosure, the collected observational data can also and/or alternatively be combined with environmental-based location information, industrial vehicle operational information, domain-level information, combinations thereof, etc., for event detection and responsiveness actions, as set out in greater detail herein. Yet further, various aspects of the present disclosure address the technical problem of event detection and responsiveness by utilizing geo-features to dynamically alter the availability of pinpoints used to collect observational feedback. In this regard, the geo-features can serve as predictive electronic structures to preemptively select and route appropriate pinpoints to electronic badges encountering such geo-features.

The technical solutions herein bring about several technical effects, including automated electronic badge communication through the combination of one or more communication networks (e.g., a personal-area network) and a local area network, improved machine-to-machine communication, and improved environmental and situational awareness between electronic badges. Moreover, the above technologies are improved by enabling mobile badges to collect observational data that cannot otherwise be collected by conventional data logging systems. By combining observational data with collected electronic data, new types of events can be recorded that are not otherwise possible. This facilitates workflows that are not otherwise possible. Moreover, checks are provided that ensure that electronically collected data properly reflects true occurrences of events by corroborating automatically collected operational data with observational data.

Other technical effects, technical problems and corresponding technical solutions are set out in greater detail herein.

System Overview

Referring now to the drawings and in particular to FIG. 1, a general diagram of a system 100 is illustrated according to various aspects of the present disclosure. The illustrated system 100 is a special purpose (particular) computing environment that includes a plurality of hardware processing devices (designated generally by the reference 102) that are linked together by one or more network(s) (designated generally by the reference 104).

The network(s) 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (WiFi), the Internet, including the world wide web, cellular and/or other arrangements for enabling communication between the processing devices 102, in either real time or otherwise (e.g., via time shifting, batch processing, etc.).

A processing device 102 can be implemented as a server, personal computer, laptop computer, netbook computer, purpose-driven appliance, special purpose computing device and/or other device capable of communicating over the network 104. Other types of processing devices 102 include for example, personal data assistant (PDA) processors, palm computers, cellular devices including cellular mobile telephones and smart telephones, tablet computers, an electronic control unit (ECU), a display of the industrial vehicle, a multi-mode industrial management badge, etc.

Still further, a processing device 102 is provided on one or more industrial vehicles 108 such as a forklift truck, reach truck, stock picker, automated guided vehicle, turret truck, tow tractor, rider pallet truck, walkie stacker truck, etc. In the example configuration illustrated, the industrial vehicles 108 wirelessly communicate through one or more access points 110 to a corresponding networking component 106, which serves as a connection to the network(s) 104. Alternatively, the industrial vehicles 108 can be equipped with WiFi, cellular or other suitable technology that allows the processing device 102 on the industrial vehicle 108 to communicate directly with a remote device (e.g., over the network(s) 104).

The illustrative system 100 also includes a processing device implemented as a server 112 (e.g., a web server, file server, and/or other processing device) that supports an analysis engine 114 and corresponding data sources (collectively identified as data sources 116).

In an exemplary implementation, the data sources 116 include a collection of databases that store various types of information related to an operation (e.g., a warehouse, distribution center, retail store, manufacturer, etc.). However, these data sources 116 need not be co-located. In the illustrative example, the data sources 116 include databases that tie processes executing for the benefit of the enterprise, from multiple, different domains. In the illustrated example, data sources 116 include an industrial vehicle information database 118 (supporting processes executing in an industrial vehicle operation domain), an industrial management system (e.g., a warehouse management system (WMS)) 120 (supporting processes executing in WMS domain that relate to movement and tracking of goods within the operating environment), a human resources management system (HRMS) 122 (supporting processes executing in an HRMS domain), a geo-feature management system 124 (supporting processes that utilize environmental-based location tracking data of industrial vehicles in a geo-domain), etc. The above list is not exhaustive and is intended to be illustrative only.

Still further, the illustrative system 100 includes processing devices implemented as electronic badges 126. The electronic badges 126 can be mobile badges, e.g., installed on workers, vehicles, etc. Electronic badges 126 can also be positioned on machines, fixtures, equipment, building structures, etc., as will be described in greater detail herein.

In this regard, this application incorporates by reference, U.S. Provisional Patent Application No. 62/354,220, titled "INDIRECT ELECTRONIC BADGE TRACKING"; U.S. Provisional Patent Application No. 62/354,235, titled "USE OF ELECTRONIC BADGES IN AISLE PASSING MANEUVER"; U.S. Provisional Patent Application No. 62/354,281, titled "ELECTRONIC BADGE AS A TALKING MARKER"; and U.S. Provisional Patent Application No. 62/354,304, titled "ELECTRONIC BADGE TO AUTHENTICATE AND TRACK INDUSTRIAL VEHICLE OPERATOR", all filed Jun. 24, 2016, the disclosures of which are incorporated by reference in their entirety. Here, capabilities of the badges described in the above Provisional applications are extended to handle observational feedback as set out more fully herein.

In certain illustrative implementations, the industrial vehicles 108 themselves can communicate directly with each other via electronic badge communicator technology, e.g., via a short-range direct communication link, thus forming a mesh network, or temporary mesh network.

One or more of the industrial vehicles 108 can also include an optional environmental-based location tracking device that works with a location tracking system schematically represented by 128, which allows position determination of the industrial vehicle 108, even when operating indoors where a traditional global positioning system (GPS) is ineffective. As will be described in greater detail herein, environmental-based location tracking can be utilized to effectively map and track the location of an industrial vehicle 108 in a dimensionally constrained environment, e.g., a mapped indoor portion of an industrial enterprise (e.g., a warehouse, a manufacturing plant, etc.).

The analysis engine 114 and data sources 116 provide domain-level resources to the processing devices, including processing devices 102, industrial vehicles 108, and electronic badges 126. Moreover, the data sources 116 store data related to activities of the industrial vehicles 108 and electronic badges 126, including the storage of information regarding captured events, industrial vehicle and pedestrian encounters with electronic badges and geo-features, combinations thereof, etc.

Industrial Vehicle

Figure 2:
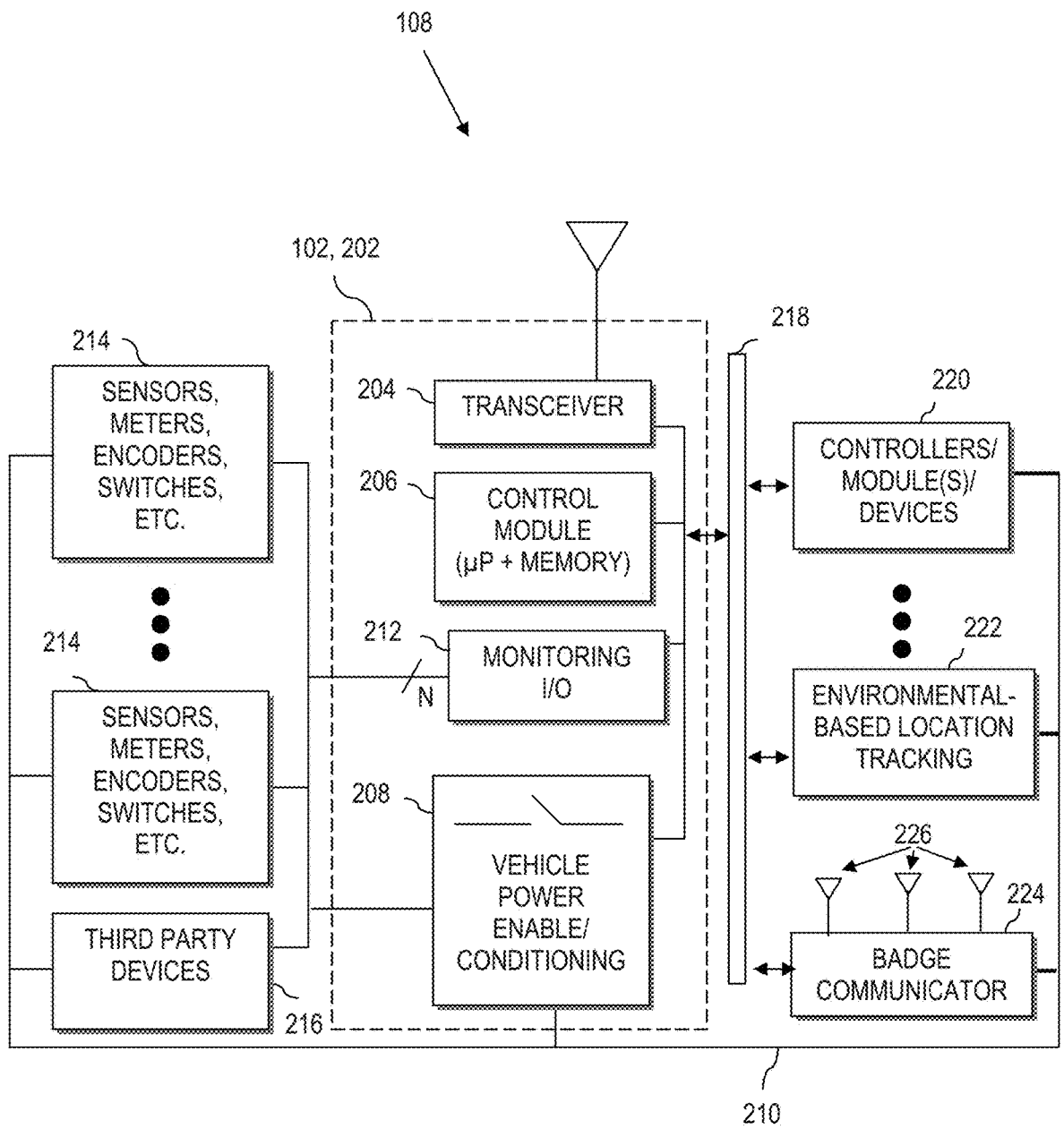
FIG. 2 is a block diagram of a system of electronics on an industrial vehicle such as a forklift truck, which includes an information linking device, an environmental-based location tracking device, and a badge communicator, according to aspects of the present disclosure.

Referring to FIG. 2, one or more industrial vehicles 108 include a processing device 102 that is implemented as a special purpose, particular computer, (further designated herein as an information linking device 202) that mounts to or is otherwise integrated with the industrial vehicle 108 (FIG. 1).

The information linking device 202 comprises the necessary circuitry to implement wireless communication, data and information processing, and wired (and optionally wireless) communication to components of the industrial vehicle 108, with the server 112 via access points 110, and with electronic badges 126. As a few illustrative examples, the information linking device 202 includes a transceiver 204 for wireless communication. Although a single transceiver 204 is illustrated for convenience, in practice, one or more wireless communication technologies may be provided. For instance, the transceiver 204 communicates with a remote server, e.g., server 112 of FIG. 1, via 802.11.xx across the access points 110 of FIG. 1. The transceiver 204 may also optionally support other wireless communication, such as cellular, Bluetooth, infrared (IR), ultra-wide band (UWB), or any other technology or combination of technologies. For instance, using a cellular to IP bridge the transceiver 204 can use a cellular signal to communicate directly with a remote server, e.g., a manufacturer server across a network 104 (FIG. 1).

The information linking device 202 also comprises a control module 206, having a processor coupled to memory for implementing computer instructions, including computer-implemented processes, or aspects thereof, as set out and described more fully herein. The control module 206 communicates with the components set forth in FIG. 2 described more fully herein making the information linking device 202 a particular machine different from a general-purpose computer. For instance, the control module 206 utilizes the transceiver 204 to exchange information with the remote server 112 (FIG. 1) for controlling operation of the industrial vehicle 108, for remotely storing information extracted from the industrial vehicle 108, etc.

The information linking device 202 further includes power enabling circuitry 208 controlled by the control module 206 to selectively enable or disable the industrial vehicle 108 (or alternatively, to selectively enable or disable specific control modules or vehicle functions such as hydraulic, traction, etc.). For instance, the control module 206 can control the industrial vehicle power enabling circuitry 208 to provide power to the industrial vehicle 108, to provide power to select components of the industrial vehicle 108, to provide power for select vehicle functions, etc. via power line 210, e.g., based upon operator login, detected geo-features, etc.

Still further, the information linking device 202 includes a monitoring input output (I/O) module 212 to communicate via wired or wireless connection to peripheral devices attached to or otherwise mounted on the industrial vehicle 108, such as sensors, meters, encoders, switches, etc. (collectively represented by reference numeral 214). The module 212 may also be connected to other devices, e.g., third party devices 216 such as RFID scanners, displays, meters or other devices. This allows the control module 206 to obtain and process information monitored on the industrial vehicle 108.

The information linking device 202 is coupled to and/or communicates with other industrial vehicle system components via a suitable vehicle network bus 218. The vehicle network bus 218 is any wired or wireless network, bus or other communications capability that allows electronic components of the industrial vehicle 108 to communicate with each other. As an example, the vehicle network bus 218 may comprise a controller area network (CAN) bus, Local Interconnect Network (LIN), time-triggered data-bus protocol (TTP) or other suitable communication technology.

As will be described more fully herein, utilization of the vehicle network bus 218 enables seamless integration of the control module 206 and other components of the information linking device 202 into native electronics of the industrial vehicle 108. In the example configuration, the control module 206 of the information linking device 202 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc. (collectively referred to by reference 220).

Environmental-Based Location Tracking

According to certain embodiments of the present disclosure, an environmental-based location tracking device 222 is provided on the industrial vehicle 108. As illustrated, the environmental-based location tracking device 222 is connected to the vehicle electronics via the vehicle network bus 218 (e.g., CAN bus). As a result, the environmental-based location tracking device 222 can communicate directly with the control module 206, as well as other devices linked to the vehicle network bus 218 of the corresponding industrial vehicle 108. The environmental-based location tracking device 222 enables the industrial vehicle 108 to be spatially aware of its location within a dimensionally constrained environment, e.g., a mapped portion of an industrial facility, e.g., a warehouse, a commercial facility, a manufacturing plant, a retail facility, etc.

In the applications described more fully herein, a conventional technology such as a global positioning system (GPS) is not likely to be effective when the industrial vehicle 108 is operated indoors. However, the environmental-based location tracking device 222 can comprise a local awareness system that utilizes markers, including fiducial markers, RFID, beacons, lights, or other external devices to allow spatial awareness within the industrial environment (e.g., a warehouse, a commercial facility, a manufacturing plant, a retail facility, etc.). Moreover, local awareness can be implemented by machine vision guidance systems, e.g., using one or more cameras. The environmental-based location tracking device 222 may also/alternatively use transponders and triangulation calculations to determine position. Yet further, the environmental-based location tracking device 222 can use combinations of the above and/or other technologies to determine the current (real-time) position of the industrial vehicle 108. As such, the position of the industrial vehicle 108 can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The environmental-based location tracking device 222 can also use knowledge read from inertial sensors, vehicle sensors, encoders, accelerometers, gyroscopes, etc., (e.g., via the controllers 220 across the vehicle network bus 218, via sensors 214 and/or third party devices 216 across the monitoring I/O 212 and vehicle network bus 218, etc.) to determine the position of the industrial vehicle 108 within the industrial enterprise and/or to augment or modify the position determination from the location tracking device 222.

The environmental-based location tracking device 222 is aware of the absolute position of the industrial vehicle 108 within a dimensionally limited environment, e.g., a mapped portion of an industrial facility. By "absolute" position, it is meant that the vehicle position is known relative to a map. The map may be a regional area, e.g., only a portion of an indoor facility such as a warehouse. Absolute position is to be differentiated from relative offset position. A relative offset position can be a general description of an offset distance, e.g., 2 meters away, without also knowing the direction of the offset. Alternatively, the relative offset position can be a general description of a direction without a distance, e.g., towards the power unit of the industrial vehicle 108, without knowing the precise distance. In other examples, the relative offset position can be a precise measure of both offset and direction, 2 meters away in direction X, Y, Z. In this situation, orientation or a standardized reference plane should be established to ensure that offset position is accurately translated to absolute position, and vice-versa. In certain illustrative implementations, the absolute position of the industrial vehicle may be known, but orientation may be unknown. In other implementations, orientation and absolute position are known.

Badge Communicator

The information linking device 202 also communicates with a badge communicator 224. The badge communicator 224 includes a transceiver for short range communication with suitably configured electronic badges (e.g., electronic badge 126 of FIG. 1) in the vicinity of the badge communicator 224, e.g., by way of non-limiting example, in the range of about 15-20 meters or less. The badge communicator 224 can communicate using any proprietary or standardized communication protocol including Bluetooth (over IEEE 802.15.1), ultra-wideband (UWB, over IEEE 802.15.3), ZigBee (over IEEE 802.15.4), Wi-Fi (over IEEE 802.11), WiMax (over IEEE 802.16), etc.

In certain illustrative implementations, the electronic badges are to be worn by pedestrians, workers, industrial vehicle operators, etc. Moreover, electronic badges can be mounted to mobile equipment, industrial vehicles or other moving objects. As such, electronic badges are also referred to herein as mobile badges when used in the context of an electronic badge that is not anticipated to remain stationary. On the other hand, certain electronic badges may be stationary, such as where mounted to the end of an aisle, on racking, above doorways or near breakrooms, or in other situations where the electronic badge is not intended to move. As such, electronic badges are also referred to herein as fixed/stationary badges when used in the context of an electronic badge that is anticipated to remain stationary.

In certain illustrative implementations, the badge communicator 224 includes at least three antennae 226. The availability of multiple antennae allows not only signal detection, but also positioning within the detection region.

Here, the badge communicator 224 computes position via time of flight calculations, phase calculations, received signal strength calculations, time difference of arrival, trilateration, multilateration, and/or other techniques that can be used to determine the direction of the communication with a corresponding electronic badge 126 (FIG. 1). In practice, the antennae 226 can each communicate with the badge communicator 224 across the vehicle network bus 218, thus allowing flexibility in the placement of the antennae on the industrial vehicle 108, which can include placement remote from the badge communicator 224 itself. For instance, each antenna 226 can be mounted on an overhead guard, power unit, work assist bar, structural component, pole, etc. Moreover, each antenna 226 can be mounted on a different location/structure of the industrial vehicle.

As illustrated, the badge communicator 224 is connected to the vehicle electronics via the vehicle network bus 218 (e.g., CAN bus). As a result, the badge communicator 224 can communicate directly with the control module 206, as well as controllers and other modules 220 of the corresponding industrial vehicle 108. Thus, the badge communicator 224 can pass information related to the detection of proximate electronic badges 126 to the control module 206 of the information linking device 202. The control module 206 of the information linking device 202 can then process the received information related to the detection of proximate electronic badges 126, send commands to vehicle controllers and modules 220, take action based upon a known location of the industrial vehicle 108 via information collected from the environmental-based location tracking device 222, pass information back to the badge communicator 224, communicate the collected information to a remote server (e.g., server 112 of FIG. 1), take action based upon information received from the remote server, combinations of thereof, etc.

In yet further configurations, an electronic badge 126 (or equivalent functions thereof) can be added to the industrial vehicle, integrated into the badge communicator 224, etc. This allows the industrial vehicle 108 to broadcast an ID to other badge communicators nearby, and to initiate communications through the local communications capabilities of the badge communicator 224.

Example Electronic Badge

Figure 3:
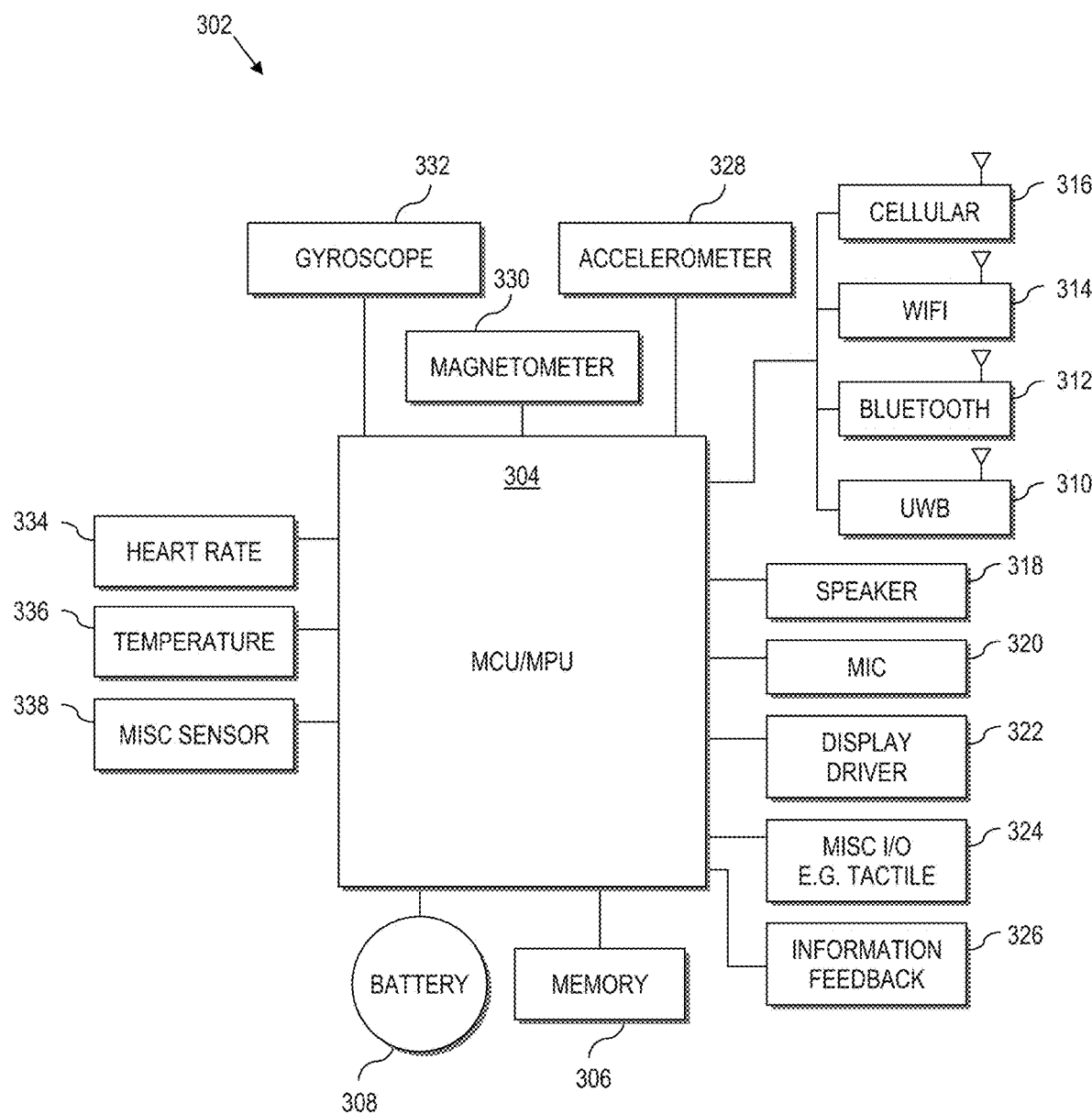
FIG. 3 is a block diagram of an example electronic badge according to aspects of the present disclosure.

Referring to FIG. 3, a multi-mode electronic badge 302 is illustrated according to aspects of the present disclosure. The electronic badge 302 can be utilized to implement the badge 126 set out more fully herein. In practical implementations, the electronic badge 126 may be a standalone electronic badge, or an electronic badge can be implemented using multiple components that mate together to form part of a system (e.g., a case/housing having certain electronics therein can be used to augment the functions and hardware of a portable electronic device, as described below.

The electronic badge 302 includes a controller (MCU/MPU) 304 having a processor coupled to memory 306. The memory 306 stores program code that causes the badge 302 to communicate with other badges 302, corresponding badge communicators 224 (FIG. 2), the server 112 (FIG. 1), combinations thereon, etc., as described more fully herein. The processor of the controller 304 also executes code in the memory 306 to read sensor data, to interact with input/output, etc. In this regard, the memory 306 further stores sensor data at least until such data is communicated out for storage, e.g., by server 112 (FIG. 1). Further, the memory 306 may store various programs and applications that instruct the processor to perform certain functions, as described in greater detail herein.

The badge 302 also includes a battery 308 to power the badge 302. In this regard, the schematic representation of the battery 308 is intended to include a battery, and/or a battery along with battery management circuitry, e.g., to conserve power, and perform other battery management functions.

The badge 302 also includes at least one wireless transceiver coupled to the controller 304 for wireless communication. At least one wireless transceiver can be compatible with the badge communicator 224 (FIG. 2) on the industrial vehicle 108. For instance, for clarity of discussion, the illustrated badge 302 includes a first transceiver 310 (e.g., an ultra-wide band transceiver) for wireless communication across a temporary communication network (e.g., a personal-area network). Further, the illustrated badge 302 includes a second transceiver 312 (e.g., a Bluetooth transceiver) to communicate over a second communication network (e.g., a personal-area network). A third transceiver 314 (e.g., a wireless fidelity (WiFi) transceiver) is provided for wireless communication over a wireless local-area network, and a fourth transceiver 316 (e.g., a cellular transceiver) is provided for communication over a cellular network. In practice, a badge 302 can include any combination of transceivers identified above and/or transceivers that operate using alternative schemes. In certain example embodiments, the first transceiver 310 and the second transceiver 312 form relatively short range (e.g., 30 meters or less in certain implementations) wireless communications with other electronic badges within range of communication.

In some instances, the two networks (e.g., created using UWB and Bluetooth) may be used in conjunction to create a zone around the electronic badge. For example, the first personal-area network (e.g., UWB) may have a larger operational radius than the second personal-area network (e.g., Bluetooth). Thus, the zone may include an outer perimeter based on the first personal-area network and an inner perimeter based on the second personal-area network.

Moreover, the badge 302 includes input and/or output devices, e.g., a speaker 318, a microphone 320, a display driver 322, other I/O devices 324 (e.g., tactile device, haptic output, camera, etc.), information feedback device 326, etc., or combinations thereof. As a further example, an input device can comprise a device analogous to the environmental-based location tracking device (222, FIG. 2).

In an illustrative example, the information feedback device 326 is implemented as an LED (light-emitting diode) indicator 326, which illuminates to communicate with the associated user. For instance, the device can illuminate when the pedestrian is in a predefined zone, in proximity to another badge or badge communicator 224 on an industrial vehicle 108, or to indicate that a message/feedback is available for the user. As another example, an LED indicator may indicate when observational feedback has been sent or received, as explained in greater detail below.

The example badge 302 also includes at least one inertial sensor coupled to the controller 304. For instance, as illustrated, there are three inertial sensors, including an accelerometer (e.g., three-axis accelerometer) 328, a magnetometer 330, and a gyroscope (e.g., a three-axis gyroscope) 332. The accelerometer 328 measures physical acceleration. Comparatively, the gyroscope 332 measures angular velocity. The magnetometer 330 acts as a compass, which is useful to determine orientation. In practice, a badge 302 need not include all three inertial measurement technologies.

Yet further, additional sensors can be coupled to the badge 302. For sake of illustration, the badge 302 also includes a heart rate sensor 334 coupled to the controller 304 to capture the measured heart rate of the individual wearing the badge 302. Moreover, an optional temperature sensor 336 can be coupled to the controller 304 to capture the measured body temperature of the individual wearing the badge 302 or to capture an ambient temperature. In practice, other sensor technologies 338 (e.g., barometer, humidity sensor, pedometer, etc.) can also and/or alternatively be integrated into the badge. As such, the electronic badge 126, 302 can be used as a physical tracker, counting the number of steps that the vehicle operator, order picker, or other industrial worker tasks. The electronic badge 126, 302 can also detect the number of times the worker bends, climbs stairs, etc. Further, the mobile electronic badge 126, 302 can also keep track of the time while the operator is off the industrial vehicle 108, e.g., time walking, carrying loads, etc.

In certain implementations, the electronic badge 126, 302 can be a hand-held mobile device, such as a smart phone, tablet, palm computer, purpose-designed electronic device, etc. For instance, a badge 302 can be implemented as a dedicated badge 302 as described herein. As another example, a badge 302 can be implemented using (in whole or in part) a smartphone. A smartphone provides a convenient structure to implement a badge because the typical smartphone already includes a display, speaker, accelerometer, processor, compass, etc. Moreover, most smart phones include or can be equipped with Bluetooth, UWB, WiFi, cellular, and other radio technologies. Yet further, smart phones facilitate rich integration by adding GPS, direct communication with a server. Thus, the electronic badge 302 may have a housing with a form factor of a mobile device.

In other implementations, the electronic badge 126, 302 can be a hand-held portable device, such as a smart phone, tablet, palm computer, etc., used in conjunction with a case, as described in greater detail herein. In implementations with a case, some of the functionality described above may be implemented in the case (e.g., ultra-wide band transceiver, improved speakers, improved microphone, additional battery, additional storage, etc., to augment the capability of a conventional smartphone to define the badge.

Applications

Figure 4:
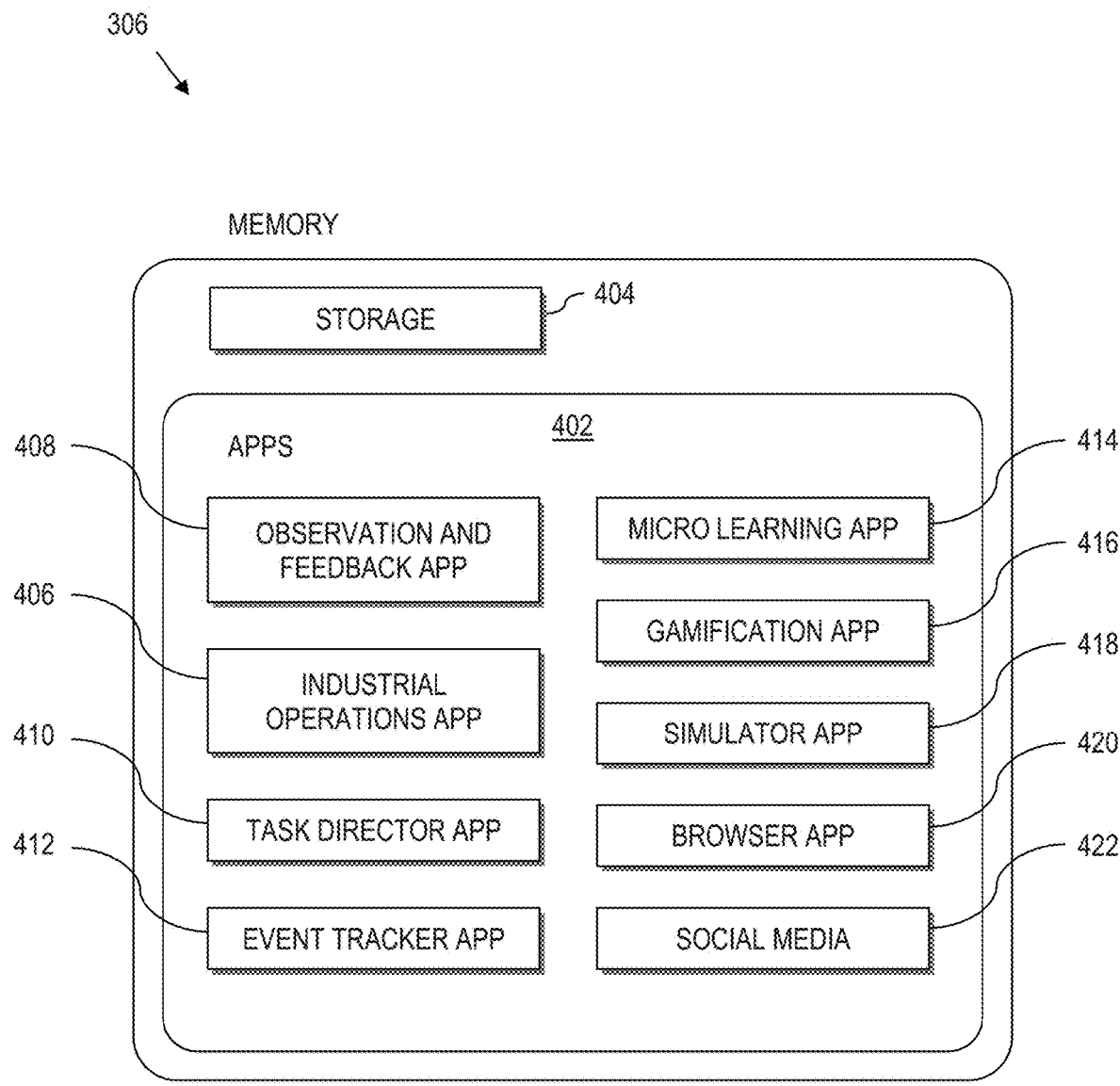
FIG. 4 is a block diagram illustrating the memory of the electronic badge of FIG. 3.

Referring now to FIG. 4, as described above the memory 306 of the electronic badge includes program code 402 for instructing the processor to perform various functions and a storage space 404 for storing other data (e.g., sensor data, industrial vehicle information, etc.). For example, the storage space 404 may be used to store an identification of a user associated with the electronic badge, event records, logs, etc. Example applications that can be stored in the program code are described below.

A first (optional) program is an industrial operations application 406 that is used to determine whether the electronic badge is communicably coupled to an industrial vehicle 108 (FIG. 1) via a transceiver of the electronic badge or is worn by a pedestrian. In an example implementation, the badge will initially function in a first mode associated with a pedestrian (i.e., pedestrian mode). For example, while in the pedestrian mode, the electronic badge may count steps taken by the user, count a number of times the user bends over to lift something, determine whether the user properly lifted (e.g., with knees, not back), give proper procedure for tasks that the user must take, etc. If it is determined that the electronic badge is coupled to an industrial vehicle, then the badge will function in a second mode associated with the industrial vehicle (i.e., industrial vehicle mode) to display vehicle gauges, etc. Thus, a single device (i.e., the multi-mode electronic badges described herein) may be used as a pedestrian badge and an industrial vehicle badge/display.

A second (optional) program may be an observation and feedback application 408 that determines if the user sends or generates observational feedback to a second electronic badge associated with another user as described more fully herein with regard to FIGS. 5-9.

A third (optional) program is a task director application 410 that determines a task for the user, and outputs the task, e.g., displays the task on the display of the electronic badge. For example, the electronic badge may receive a schedule of tasks for the user from the server 112 (FIG. 1). As another example, the electronic badge may determine a task for the user based on an environmental-based location tracking system or other task driven input.

A fourth (optional) program is an event tracker application 412 that manages events. Events are described more fully herein with reference to FIGS. 5-9.

A fifth (optional) application is a micro-learning application 414 that determines context sensitive help based on received observational feedback, an outcome from the event tracker application, a task associated with the user, combinations thereof, etc. Microlearning can be used to provide training, on-demand information, and context sensitive help related to specific operational issues.

A sixth (optional) program is a gamification application 416 that provides games available to the user. The games provided may be useful to short-term entertainment and can optionally be related to or otherwise linked to microlearning, e.g., the context sensitive help. Further, the user's access to the games may be dependent on other factors such as the user's participation in observable feedback (e.g., did the user send proper observable feedback, did the user receive positive observable feedback, etc.). In practical applications, gamification is time-limited.

A seventh (optional) program is a simulator application 418 that can be used for instance, by technicians for virtual reality and augmented reality training simulation.

An eighth (optional) program is a browser application 420 that executes an HTTP browser on the electronic badge, e.g., to browse a local intranet, extranet, internet, etc.

A ninth (optional) program is a social media application 422. The social media application allows the user to interact with work peers, and to optionally access and share information with co-workers, etc.

Event Types and Pinpoints

As used herein, "event types" are used to characterize different categories of events to which observations can be applied. In this regard, event types can cover any type of information of interest to an enterprise. Event types can be fixed or cycled to keep the subject of interest constantly refreshing in an environment.

Pinpoints are associated with event types. In general, a pinpoint specifies an observable characteristic associated with a given event type. In general, there can be one or more pinpoints per event type. In practical applications, there can be multiple pinpoints per event type. In an illustrative example, pinpoints are directed to queries that can be answered in full or in part, based upon observational feedback.

In certain implementations pinpoints can be recycled, reordered, dynamically changed, etc. based upon operational factors. For instance, once a pinpoint has been observed in the positive for a predetermined amount of time, that pinpoint can be retired, modified, or otherwise tweaked. Moreover, pinpoints can be dynamically added so that observational opportunities periodically change.

In this regard, event types are useful to categorize pinpoints to reduce the number of optional pinpoints for a given scenario. For example, an event type may comprise a welding manufacturing cell. In this regard, all relevant pinpoints pertain to the job at hand, e.g., welding operations, cleaning operations, environment procedure, etc. Another example event type is end-of-aisle policy. Here, pinpoints can comprise "stop" and "sound horn" for an industrial vehicle operator, but "stop" and "make eye contact with driver" if the user is a pedestrian. Numerous other examples can be implemented depending upon the specific implementation details.

Marker Badge Vs. Mobile Badge

As noted above, badges can be mobile, e.g., worn by workers, installed on vehicles, etc. Badges can also be fixed/stationary. Such badges can be used to implement geo-based features or capabilities. For instance, a marker badge can be used to convey to a mobile badge coming into range with the marker badge, specific, geo-based information. In one example, one or more pinpoints are dynamically changed when the marker badge is encountered. Moreover, detection of the marker badge can cause different pinpoints based upon the role of the user of a mobile badge. For instance, a pedestrian at an intersection can receive different pinpoints than an industrial vehicle operator.

In yet further examples, a marker badge can include Bluetooth and UWB, each utilized for the same or different purposes. In an example implementation, Bluetooth-based marker badges 126 are used for a pedestrian version of geo-based tracking. Here, the Bluetooth in the marker badges are set up for relatively shorter-range due to the fact that pedestrians are on foot and generally moving more slowly than a vehicle. UWB is used to create geo-zones for industrial vehicles.

As yet further examples, marker badges 126 set up as Bluetooth nodes can be physically spaced closer together compared to UWB nodes due to energy constraints, cost, a combination thereof, etc.

Observational-Based Event Recording

Figure 5:
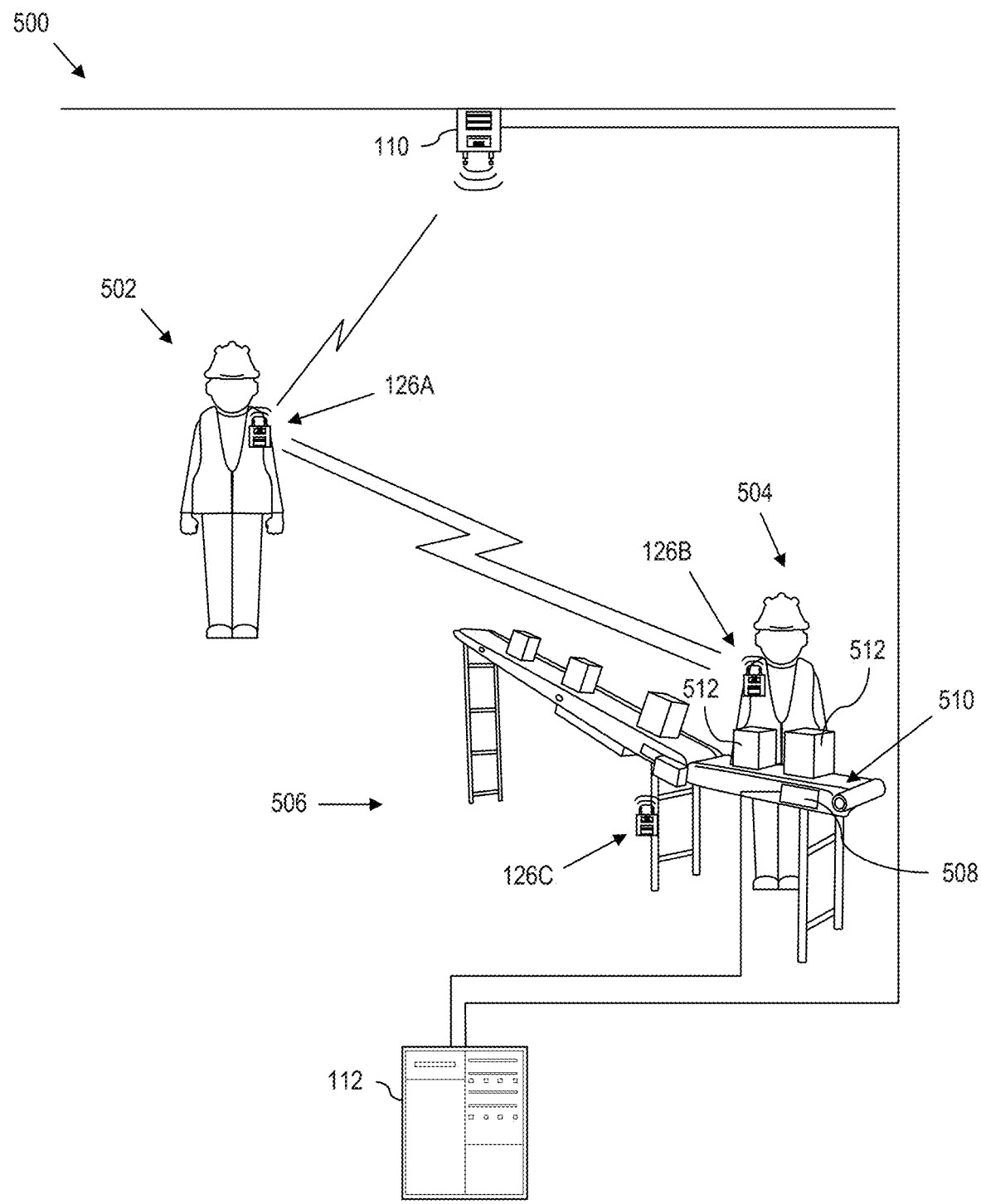
FIG. 5 is an example pedestrian-to-pedestrian encounter presenting an opportunity to generate an observational feedback event record.

Referring to FIG. 5, in certain environments, such as warehouses, manufacturing facilities, retail stores, construction sites, etc., observation and feedback can be deployed to generate event records that cannot otherwise be obtained. These improved event records can in turn, be used to drive automated and electronic driven actions that improve system performance. For instance, the observation and feedback application 408 (FIG. 4) can be triggered to execute the below examples of observation and feedback.

By way of illustration and not by way of limitation, an environment 500 is illustrated in which a first worker 502 is in proximity to a second worker 504. The second worker 504 is illustrated as being stationed at a work area 506 where the second worker is engaged in performing a series of work-related tasks. Moreover, the first worker 502 is wearing a first badge 126A, and the second worker 504 is wearing a second badge 126B. In this regard, the electronic badges 126A, 126B can have any one or more of the features set out and described more fully herein, especially with reference to FIG. 3 and FIG. 4.

In a practical application, the first badge 126A and the second badge 126B form a temporary, wireless communication when the two devices are within range of one another. As described more fully herein, the personal-area network is used for relatively limited (i.e., short-range) communication. For instance, if implemented using Bluetooth transceivers, it is possible to achieve a range of up to 100 meters or more. However, since the interaction is based upon observational feedback (i.e., observations that a user of the first badge 126A makes within an environment, e.g., a work environment), the Bluetooth capability may be limited to a relatively short range, e.g., 0.5 meters to 20 meters (limited by a reasonable range for making the observation). As a further example, Bluetooth can be operated in a low power mode limiting the range up to approximately 10 meters.

As yet another example, if the transceivers forming the personal-area network are ultra-wide band, the range can extend up to 50 meters. However, a more practical limit may be up to approximately 10 meters. Such distance/range limitations not only provide conditions suitable for observational feedback to be recorded, but also improve the spatial capacity of the transceivers and/or conserve power. Moreover, the range of the first badge 126A and the second badge 126B can be different, e.g., based upon the role of each user. Moreover, the ideal range of each transceiver can be set based upon a maximum desired range for observational feedback.

In yet a further example, a combination of Bluetooth and ultra-wide band can be used to form the personal-area network. For instance, ultra-wide band transceivers in each badge 126A, 126B can define an outer perimeter of the personal-area network, whereas Bluetooth can be used for a shorter range inner perimeter.

Observation

In a first example implementation, assume that the second worker 504 is performing a work task that requires a particular action, e.g., wear a hard hat while in work area 506, and that the first badge 126A and the second badge 126B have formed a personal-area network, thus designating an encounter.

As will be described more fully herein, observational feedback is optional, e.g., observational feedback can be performed when convenient, when a particular situation deems feedback necessary or helpful, etc. Sometimes, due to the nature of workflow, a worker does not have time to provide observational feedback. Other times, a worker may deem observational feedback unnecessary e.g., when such feedback may be considered overly redundant, etc. Such scenarios are within the spirit of the present disclosure.

In general, a worker provides observational feedback via a corresponding badge, which can be worn by the worker, e.g., on a vest, in a pocket, or is otherwise on the person. Upon presenting observational feedback, the badge converts the feedback into an electronic message that is processed into an event.

By way of example, assume the first worker 502 provides observational feedback with regard to the second worker 504. More particularly, the first badge 126A receives an electronic message characterizing an observation made by the worker 502 assigned to the first badge 126A relative to a worker 504 assigned to the second badge 126B. This can be accomplished in several different ways.

Assume that the first worker 502 can observe that the second worker 504 is wearing a hard hat through visual observation. In a first example, the first worker 502 speaks a phrase into a microphone input of the first badge 126A, e.g., "wearing hard hat". Alternatively, the worker 502 can interact with the badge 126A by interacting with other input options, e.g., keypad, touchscreen display, etc., as set out more fully herein. The electronic message corresponding to the spoken phrase is converted to a pinpoint response that is associated with a pinpoint.

As an alternative, the badge 126A can already have one or more pinpoints available. Here, the badge 126A can trigger one or more messages to the first user, e.g., via the speaker 318 (FIG. 3), tactile buzzer 324 (FIG. 3), information lights 326 (FIG. 3), display, etc. For instance, the badge 126A can convey a message via the speaker 318 such as, "Is the second user wearing a hard hat"? In this example, the user observational feedback can be a Yes/No answer, a statement, e.g., "user is wearing a hard hat", or phrase, e.g., "hard hat". In still another example, the encounter can trigger a display on the first badge 126A to list out one or more pinpoints. The first worker 502 can then interact with the display, e.g., via touch on a touchscreen, via a stylus, keypad, etc., to enter one or more of the pinpoints.

In yet another example, the first worker 502 can create a "virtual scorecard" by interacting with the first badge 126A by identifying an event type, e.g., "location: packing cell 1", and then dynamically assign one or more pinpoints that characterize observations about the second worker 504 at in the circumstance. The first worker 502 can also add annotations, comments, instructions, requests, etc., to the virtual scorecard.

In an example process, an electronic message characterizing an observed event is converted into a pinpoint response, which can optionally be associated with the second badge 126B. This can occur on the badge 126A, on the server 112, a combination thereof, etc. Again, this can occur in different ways. In a first example, the system may not have obtained a pinpoint prior to receiving the electronic message. As such, the system searches a database to obtain a pinpoint that is associated with the pinpoint response. Moreover, the system can convert the pinpoint response into a new pinpoint if a pinpoint cannot be found that links to the pinpoint response. Alternatively, where one or more pinpoints were extracted before the observational feedback was obtained, the system can associate the pinpoint response to the associated pinpoint.

The pinpoint and pinpoint response can also be linked to a corresponding event type. For instance, a work area event type in this example.

Based upon the observational feedback provided, an event record is generated. The event record includes an identification of the event type and the pinpoint response. The generated event can include other information, such as the pinpoint, timestamp, scorecard, etc. Yet further, an ID associated with the user of the first badge 126A, the user of the second badge 126B, or both can be identified. Still further, the user of the first badge 126A, the user of the second badge 126B, or both can remain anonymous. In this regard, general information can be collected without identifying specific parties involved.

The worker 502 can also optionally utilize other features and/or capabilities of the badge 126A to collect information that forms part of the event record. For instance, where the badge 126A includes a camera, an image or short video can be captured, which can be attached to the event record. Where the badge 126A includes a microphone, an audio clip can be collected, etc. Moreover, data from a sensor, e.g., heartrate monitor, temperature sensor, pedometer, etc., can be added to the event record. Yet further, other discoverable information can be added to the event record, including the time, the date, data accessible by the server 112, data accessible by the first badge 126A, data accessible by the second badge 126B, etc.

Yet further, in an example implementation, the second badge 126B provides information that is added to the event record. For instance, where the second badge 126B includes sensors, such data can be collected and added to the event record. Moreover, data regarding the second worker 504, the second badge 126B, a combination thereof, etc. can be added to the event record. For instance, information characterizing an operating shift, the number of hours worked, the number of steps taken, work tasks completed, packages lifted, etc., which can be measured and recorded by the badge 126B (or badge 126B working in cooperation with the server 112) can be included in the event record. As such, data can be collected to provide context surrounding the observation recorded by the first worker 502.

In this scenario, it is also possible for the second worker 504 to provide an observation with regard to the first worker 502. That is, in an example implementation, any worker having a badge 126 can be presented with opportunities to provide observation, feedback, or both upon an encounter.

Feedback

The above-system can also be utilized to provide feedback, e.g., in response to an observation, or as a positive reinforcement message. In an example implementation, feedback can be generated by the first badge 126A, the server 112, etc., based upon the recorded observation to an associated pinpoint. In yet further example implementations, the first worker 502 interacts with the badge 126A, e.g., via voice command, interaction with a touch display, keypad, etc., to generate feedback intended for the second worker 504. The feedback can also include an image, video, sensor data or other discoverable information analogous to that described above. This feedback can be in addition to, or in lieu of recording an observation.

The feedback is delivered to the second badge 126B, which can decide when and how to deliver the feedback to the second worker. For instance, the second badge 126B may inform the second worker 504 of the feedback by flashing an information device 326 such as a light (FIG. 3). Here the light may be informative (e.g., you received feedback). Alternatively, the color, flash pattern, brightness or other information can be used to indicate whether the feedback is positive or negative. Moreover, a tactile device, e.g., 324 (FIG. 3) can inform the second worker 504 of feedback. Yet further, a speaker 318 (FIG. 3) can play a tone or announce that feedback has been given. The speaker can play back the feedback if in the form of a recorded message. Yet further, the second worker 504 can observe on a display screen, the pinpoint associated with the feedback. Here, the second worker 504 can view the feedbacks in real time, or queue up feedback information to review later, e.g., at the end of a shift.

In further implementations, the system can generate feedback based upon either the observation, or a history. For instance, based upon a recorded observation, the server 112 can check a historical profile of the second worker 504. If the recorded observation is in agreement with worker trends of appropriate environment behavior, the system may not need to generate any further feedback. On the other hand, if the observation warrants, e.g., a trend of improper behavior is noted, then a feedback can be generated with an indication to the second worker 504 to engage a micro learning session via a micro learning application 414 (FIG. 4). The micro learning application 414 (FIG. 4) can play back an instructional video, provide text, or other information that allows the second worker 504 to gain knowledge with regard to a context specific issue.

In certain implementations, the second worker 504 can annotate information that can be attached to the event record. For instance, the second badge 126B can also optionally be used to capture an image, video, sensor data, discoverable data, etc., from the perspective of the second worker 504. Yet further, the second worker 504 may annotate a comment using a keypad, touchscreen, etc.

Merging Observation/Feedback with Event Records

In a second example implementation, assume that the second worker 504 is performing a work task that requires a particular action, e.g., wear a hard hat while packaging a particular item at work area 506 and that the first badge 126A and the second badge 126B have formed a personal-area network, thus designating an encounter.

A sensor 508 associated with a work surface 510 of the work area 506 detects the presence of the particular item 512 and generates an operational event record therefrom, e.g., which is sent to the server 114. The event record generated strictly from data collected from the sensor 508 can include information such as the time, date, identifier code of the item 512, an operator identification code of the worker 504, other information, combinations thereof, etc. However, the electronically detected event record cannot tell whether the worker 504 is wearing a hard hat. On the other hand, the worker 502 can observe whether the worker 504 is wearing a hard hat and provide observation-based feedback. Thus, observational-feedback is used to augment, modify, enhance, complete, aggregate with, etc., the operational generated event record. Here, the electronic badge of the first worker 502 and the electronic badge of the second worker 504 each have a unique identifier. At least the identifier of the electronic badge associated with the second worker 504 can be incorporated into an observation event record. The identifier of the electronic badge of the first worker 502 may be recorded into the event record, or the identifier of the electronic badge of the first worker 502 may be omitted thus providing an anonymous event record.

As yet a further example, the system identifies an event type. In this example, the event type may comprise "handling item at work area". The event type can be identified based upon an identification of the first worker 502, based upon the identification of the second worker 504, based upon discoverable data, e.g., time, date, location, task assigned via the WMS, LMS, etc., Health and Wellness system, based upon detecting the sensor 508 or event record generated by the sensor 508, combinations thereof, etc.

The system also identifies a pinpoint that is linked to the identified event type. In this example, an electronic pinpoint is "observe wearing hard hat". In practice, there can be one or more available or possible/optional electronic pinpoints for each event type.

In a first example implementation, the system detects that the second worker is engaged in the handling the item 512 via a message communicated from the server 114 to the first badge 126A. Notably, this example demonstrates that the first badge 126A is capable of communication over Wi-Fi with the server 112, e.g., across a local area network independently of communication with the second badge 126B via the personal-area network. In another example implementation, the first badge 126A identifies the event type based upon receiving an identifier from the second badge 126B via the personal-area network.

Observation-based feedback can be collected using one or more of the techniques described above. In this regard, the observation-based feedback can be used to generate its own event record, or the observation-based feedback can be merged into the operational event record generated responsive to the sensor 508.

Geo-Driven Pinpoints

In this example, the first badge 126A becomes aware of relevant pinpoints, e.g., based upon detecting the marker badge 126C, environmental based location tracking, or other suitable geo-location based techniques. Here, the marker badge 126C can send the relevant pinpoints directly to the first badge 126A. In another example, the marker badge 126C can send the relevant pinpoints to the second badge 126B, which can forward the pinpoints to the first badge 126A. Yet further, the first badge 126A can send an identifier of marker badge 126C to the server 112 to retrieve the relevant pinpoints.

Thus, by using geo-based badges 126, environmental based location tracking, or other suitable geo-location based techniques, the badges 126 are constantly dynamically updated with relevant pinpoints.

Geo-Driven Event Records

In yet another example implementation, geo-based information is used to determine the event type, one or more pinpoints, or a combination thereof. Here, geo-based information can be obtained from environmental based location tracking, a detected marker badge 126C, or other suitable geo-location based technique. For instance, a system analogous to the environmental based location tracking 222 described with reference to the industrial vehicle system (FIG. 2) can be integrated into the badges 126. As yet another example, geo-based information can be obtained by triangulation, e.g., based upon using a Wi-Fi radio 314 (FIG. 3). Yet further, as described more fully herein, badges 126 can be used as marker badges, e.g., to mark geo-locations. As such, the first badge 126A can use a Bluetooth radio 312 (FIG. 3), an UWB radio 310 (FIG. 3), combination thereof, etc., to become aware of a geo-location through communication with one or more marker badges 126.

In an example implementation, the first badge 126A detects that the second device 126B is in work area 506 via another badge, e.g., optional fixed marker badge 126C, which is located within the work area 506. Here, the fixed marker badge 126C functions to designate a geo-zone.

In this regard, observation-based feedback can be collected using one or more of the techniques described above. Also, the observation-based feedback can be used to generate its own event record, or the observation-based feedback can be merged into an operational event record generated responsive to the sensor 508.

Observational Feedback Restriction/Verification

As noted above, geo-driven marker badges 126 can provide relevant pinpoints (measures) for observations and feedback in specific geographic areas so the pinpoints needed on a mobile badge 126 are always updated and relevant for the area the user is in. However, in a further embodiment, geo-based marker badges are used to verify that the observation is appropriate in the context of the encounter. For instance, a limited range Bluetooth marker badge can make it impossible or at least highly unlikely for an individual to record an observation or give feedback on a mobile badge 126 unless the user was actually in sight of the person they were doing the observation or providing feedback on.

In further example implementations, operational event records, e.g., like those generated by the sensor 508 in the examples above, can be used to judge whether the observation was proper, e.g., by correlating observational data to operational data as a form of verification.

In alternative implementations, other badge features can be used to verify or restrict observation and/or feedback. For instance, the illustrated badge 126 (FIG. 3) includes a magnetometer 330 (FIG. 3) and/or gyroscope 332 (FIG. 3) to determine the orientation of the first worker 502. This orientation information is compared to the relative position of the second worker 504 to judge whether the first worker 502 is in an appropriate position and orientation to provide the observation and/or feedback. The system can also use an accelerometer 328 and/or optional sensor 338 (FIG. 3) such as a light sensor, barometer, thermometer, air humidity sensor, combination thereof, etc., to determine whether the recorded observation and/or feedback is appropriate.

Observation/Feedback is Optional

Once a temporary, wireless personal-area network is established between the first badge 126A and the second badge 126B, observational feedback can be generated and recorded. However, there may not be a strict requirement that observation-based feedback is provided. Rather, once a temporary personal-area network wireless communication connection is made between the first badge 126A and the second badge 126B, an encounter is designated, which creates an opportunity for observation-based feedback to be generated and collected into event records. Such is useful in situations where mandatory observation-based feedback can place too much burden on the users, which can interrupt workflow. Rather, observation-based feedback may be given when convenient to either user. In this regard, participation rates in the range of 10%-30% of encounters can still generate effective results.

Dynamic Throttling of Observation/Feedback

In certain implementations, it may be desirable to mask encounters so that no opportunity for observation/feedback is provided. In other applications, the system may require one or more individuals to provide observation and/or feedback according to a prescribed interval, e.g., once a shift, three times a week, etc. Yet further, the system can dynamically throttle when to prompt (or require) users to provide observation and/or feedback. For instance, more opportunities for observation and/or feedback may be generated at the start of a shift, before and after break times, towards the end of a shift, etc. In this regard, indicator lights or other information mechanisms on the badges can be used in certain example implementations, to inform users when there is an opportunity to provide observational feedback.

In yet further aspects, the workers histories can be used to determine how frequently observational feedback is required. For instance, in an example implementation, the system uses a threshold, scale or other feature to determine a frequency to collect observational feedback. Similar approaches can be employed based upon the detected event type. For instance, different tasks, environment locations, etc., can trigger a variable frequency of opportunity (or requirement) for observation.

Predictive Observation/Feedback

In certain implementations, the system can use predictive analytics to know when to queue opportunities to provide feedback. For instance, with reference to the above-examples, the system can use geo-information, e.g., from the marker badge 126C, from an environmental based location tracking system, etc., to predict where a worker will be in the short term, and automatically queue up relevant pinpoints and/or prompt the worker to provide opportunity for observation and/or feedback. The system can also use such predictions to decide to suppress opportunities for observation and/or feedback.

Yet further, in example implementations, the first badge 126A can utilize discoverable information, e.g., by interacting with the server 112 in order to predict activities of the associated worker, in order to decide whether to present opportunity for observation and feedback, to suppress opportunities for observation and feedback, to require the user to provide observation and feedback, etc. By way of illustration, through interaction with the industrial operation application 406, the badge 126 can become aware of a context or role of the associated worker. Likewise, by interacting with the task director application 410, the system knows what tasks are assigned and optionally queued up for the worker. As such, the system can "look ahead" of the worker to predict relevant pinpoints, and to determine if and when to present opportunities for observation and feedback as described more fully herein. Moreover, once a temporary wireless personal-area network is created, a first badge can interact with its task director application 410 to know what tasks are assigned and optionally queued up for a worker associated with the connected badge. As such, the system can "look ahead" of the nearby worker to predict relevant pinpoints for observation, and to determine if and when to present opportunities for observation and feedback as described more fully herein.

Pedestrian/Vehicle Interaction

Aspects of the present disclosure are not limited to pedestrian/pedestrian encounters. For instance, with reference to FIG. 6, a worker 602 is temporarily in short range of an operator 604 of an industrial vehicle.

Assume in this example, that the industrial vehicle is in a designated geo-zone, e.g., a stop zone 606. A warehouse policy indicates that the industrial vehicle operator must stop, sound the horn, and look both ways before advancing the industrial vehicle into the intersection.

The industrial vehicle, e.g., via the information linking device 202 (FIG. 2) utilizes its data logging ability to read control module data over the vehicle network bus 218. The control module 206 detects that the industrial vehicle is in a geo-zone via the environmental based location tracking system 222. In response thereto, the control module 206 records that the industrial vehicle stopped and sounded the horn. However, the control module 206 cannot confirm that the vehicle operator looked both ways before entering the intersection.

However, the badge communicator 224 (FIG. 2) on the industrial vehicle and the badge 126A form a temporary network. Here, the first worker 602 observes that the industrial vehicle operator did look both ways and in response thereto, the first worker 602 generates observational feedback. As such, an event record is generated indicating that the vehicle operator looked both ways, e.g., using any of the techniques set out more fully herein, e.g., with regard to FIG. 5.

As another example situation, assume that the worker 602 is under an obligation under the rules of the warehouse to make eye contact with the industrial vehicle operator before the industrial vehicle enters the intersection. Here, the industrial vehicle operator 604 can generate an observation and/or feedback with regard to the first worker 602.

The industrial vehicle then drives through the intersection breaking the range of the badge 126A of the first worker, thus terminating the temporary network.

Response

Based upon providing feedback, workflows can be automatically triggered, e.g., to initiate automated electronic processes, to send messages, instructions, positive reinforcements, to trigger training, the generation of reports, scorecards, comparisons, etc. The observation data can also be used to modify the performance of industrial vehicles, machines, and other electronics associated with an electronic badge. For instance, return to the above-example of a forklift operator entering an intersection. Assume that the pedestrian enters an observation that the forklift operator did not look both ways before driving through the end of the aisle. Here, the warehouse operating procedure was not followed. As such, the forklift truck may display a message for the operator. As another example, the performance of the forklift itself may be augmented e.g., performance tuned to modify the vehicle performance based upon vehicle operator score. Likewise, demonstrating correct/positive observations can result in performance tuning the forklift up, increasing vehicle capability based upon an improved operator score/skill level.

Example Algorithms for Observation and Feedback

Figure 7:
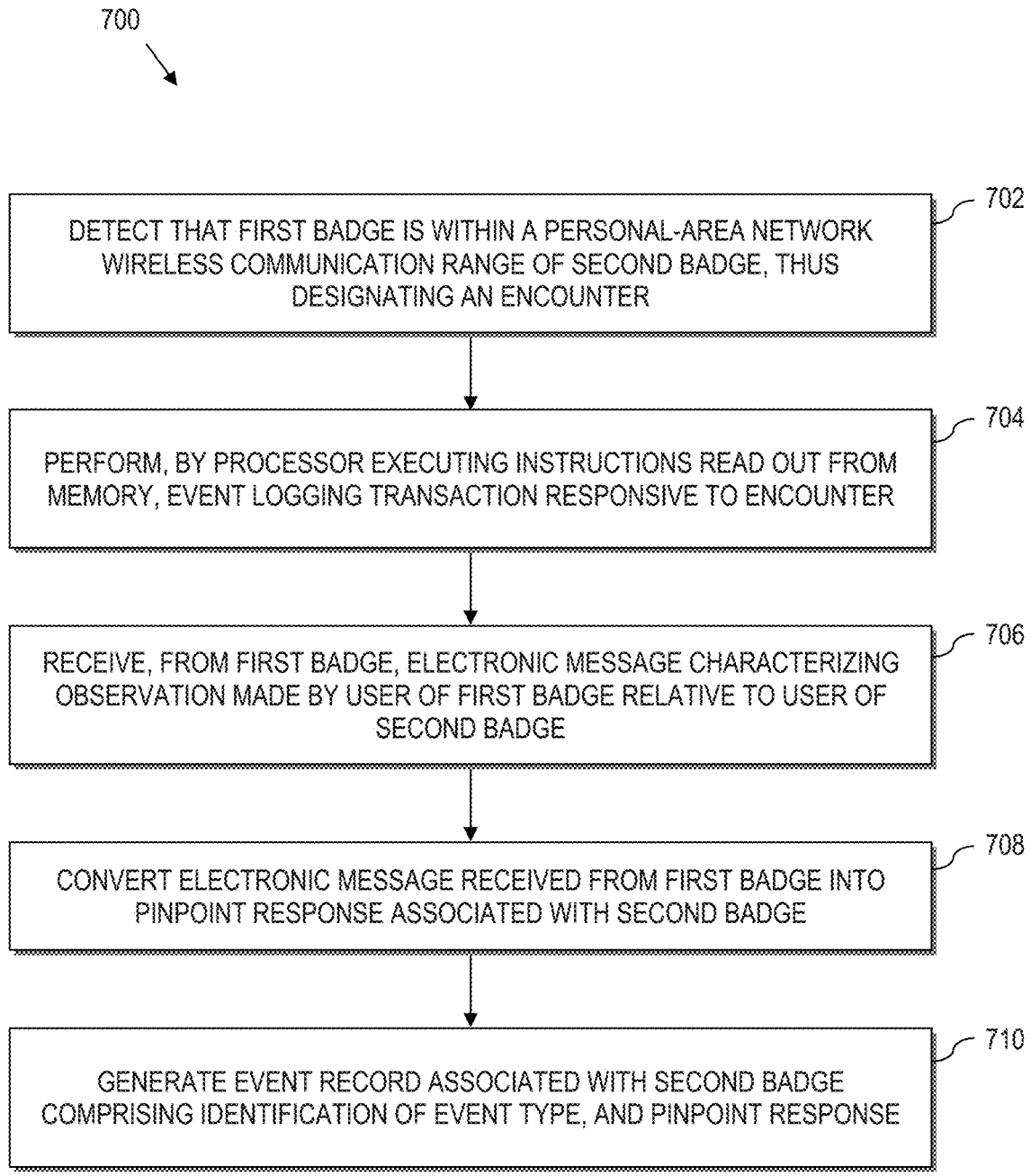
FIG. 7 is a flow chart of an example algorithm for carrying out a computer-implemented process for event tracking based upon observational feedback.
Figure 8:
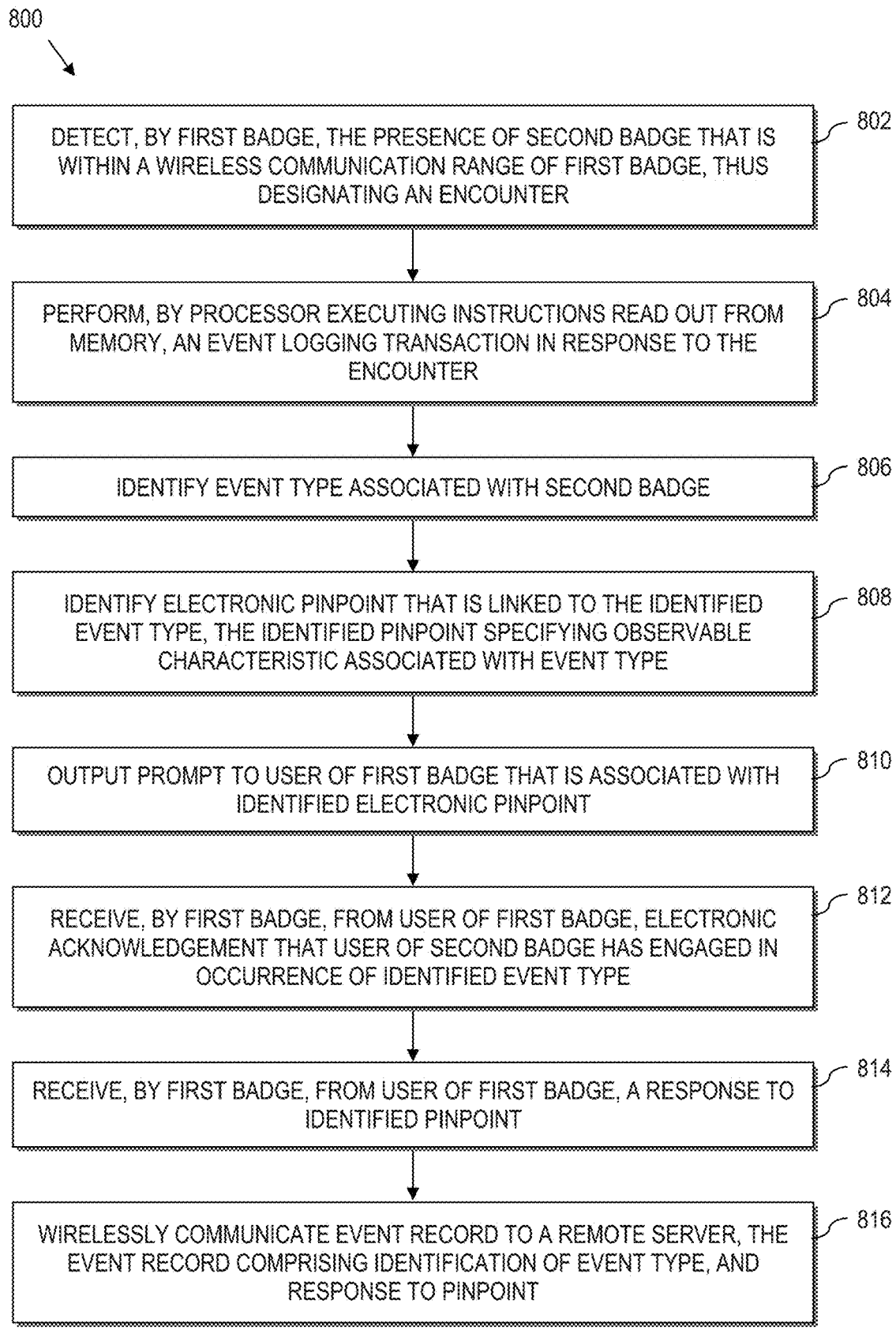
FIG. 8 is a flow chart of an alternative example algorithm for carrying out a computer-implemented process for event tracking based upon observational feedback.
Figure 9:
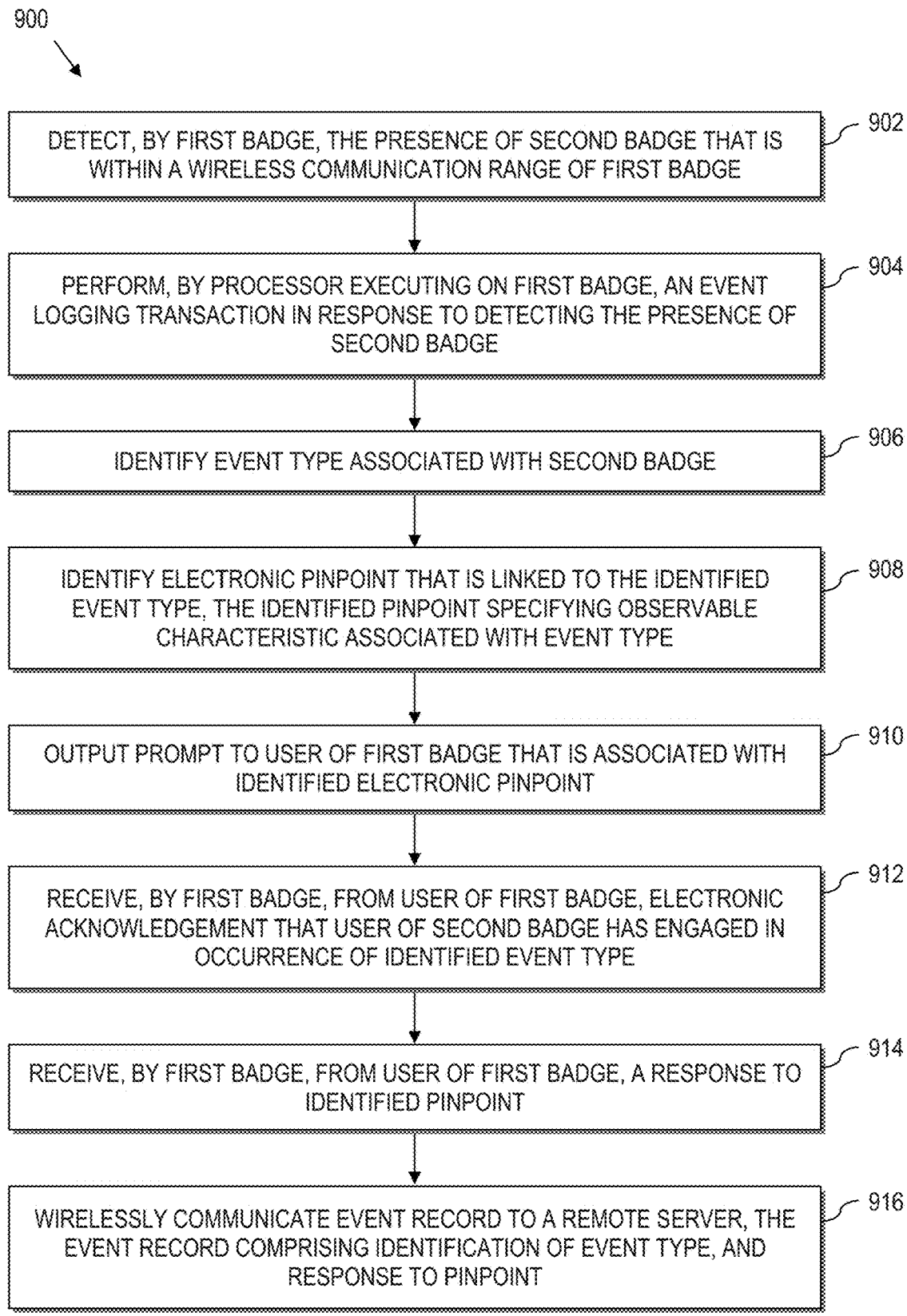
FIG. 9 is a flow chart of yet another alternative example algorithm for carrying out a computer-implemented process for event tracking based upon observational feedback.

FIG. 7-FIG. 9 illustrate non-limiting examples of algorithms for carrying out aspects of the present disclosure. Each disclosed algorithm can be implemented as a computer-implemented process. In this regard, the computer-implemented process can be implemented by a processor coupled to memory that stores instructions that when read out and executed by the processor, implements relevant aspects of the computer-implemented process. For instance, the computer implemented process can be carried out by the server 112, one or more badges 126 (e.g., two or more badges 126 that form a personal-area network), by a processing device 102, by a combination thereof, etc. Processing may be carried out by one of the above-described processing devices entirely, or the processing can be distributed across one or more processing devices. The algorithm may be carried out by the server 112 in a first embodiment, but on a mobile badge 126 in a different embodiment, e.g., depending upon the processing capability, network bandwidth, number of transceivers, etc.

Figure 6:
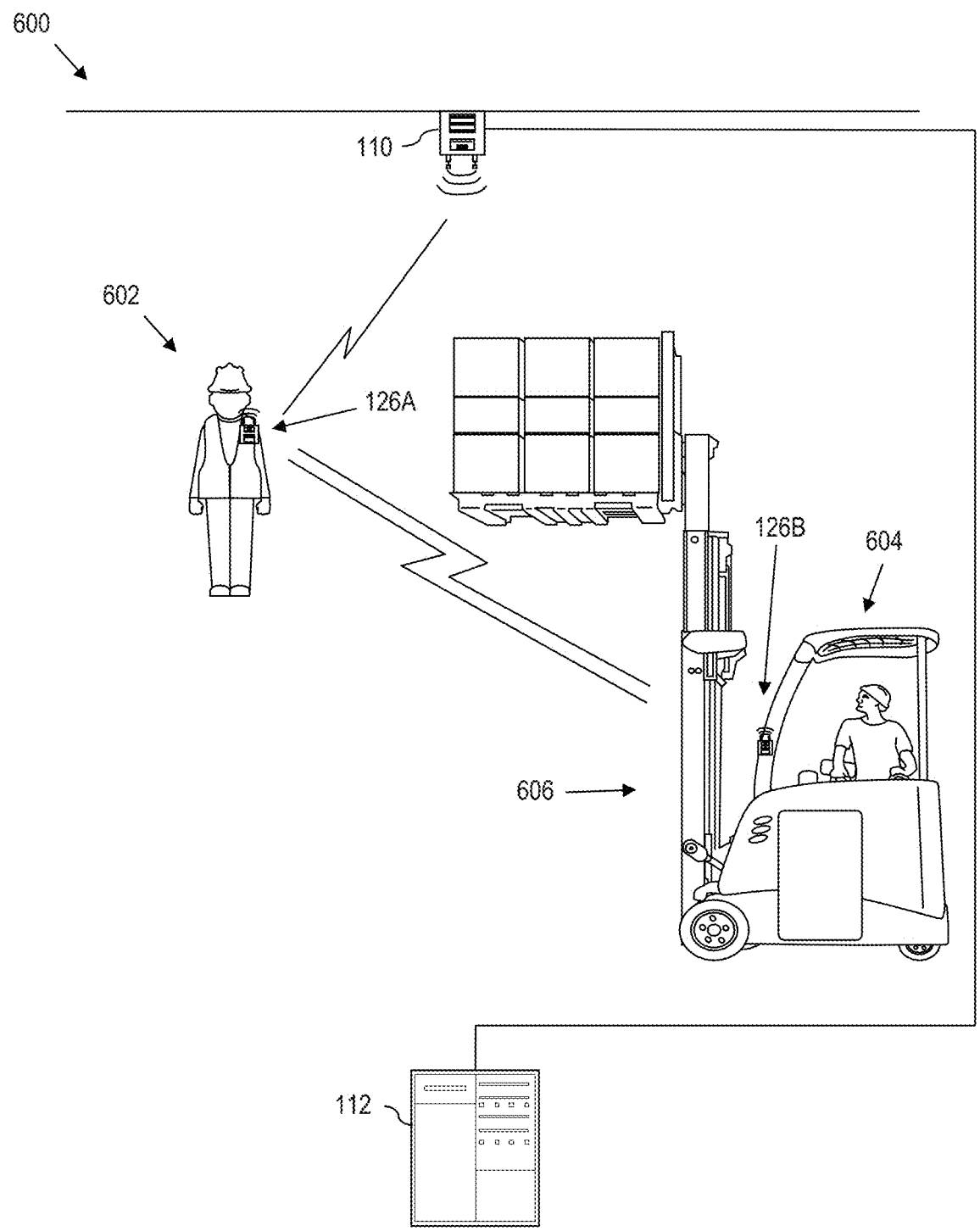
FIG. 6 is an example pedestrian-to-industrial vehicle encounter presenting an opportunity to generate an observational feedback event record.

In this regard, the algorithms of FIGS. 7-9 can be used to carry out the techniques, processes, functions, capabilities, etc., in any combination, described in greater detail herein with regard to FIGS. 5-6, using any combination of the structures, configurations, systems, capabilities, etc., described with reference to FIGS. 1-4. Accordingly, any combination of features described throughout this document can be used with any algorithm in any desired combination unless contradictory.

Referring to FIG. 7, a computer-implemented process 700 of tracking events is illustrated. The computer-implemented process 700 comprises detecting, at 702, that a first badge is within range of a second badge and forming a temporary wireless personal-area network therebetween, thus designating an encounter. For instance, the process can receive a message from at least one of the first badge or the second badge indicating that the first badge and the second badge have established a temporary, short range, wireless connection. As described more fully herein, the received message can be based upon a personal wireless network connection established via at least one of Bluetooth or ultra-wide band. In an alternative example, the message can be received wherein the temporary, short range, wireless connection is comprised of a first perimeter of a zone implemented by ultra-wide band and a second zone implemented by Bluetooth.

The computer-implemented process 700 also comprises performing, at 704, by processor executing instructions read out from memory, an event logging transaction responsive to the encounter. The event logging transaction is carried out by receiving, at 706, from the first badge, an electronic message characterizing an observation made by the user of the first badge relative to a user of the second badge. By way of example, the electronic message characterizing the observation can comprise receiving the electronic message which was translated from a voice command issued by the user of the first badge.

The event logging transaction is further carried out by converting, at 708, the electronic message received from the first badge into a pinpoint response, and generating, at 710, an event record comprising an identification of an event type, and the pinpoint response.

The computer-implemented process 700 can also further comprise communicating an instruction to the first badge to prompt to a user of the first badge with a message conveying an opportunity to provide observational feedback and receiving, from the first badge, via input of the user of the first badge, an electronic acknowledgement that a user of the second badge has engaged in an occurrence of an observable event.

The computer-implemented process 700 can also comprise identifying an event type associated with an observable event carried out by the user of the second badge, which is observable by the user of the first badge. Here, the computer-implemented process further comprises identifying an electronic pinpoint that is linked to the identified event type (where the identified pinpoint specifies an observable characteristic associated with the event type), and communicating an instruction to the first badge to prompt to a user of the first badge with a message conveying the electronic pinpoint. In this implementation, receiving, from the first badge, an electronic message characterizing an observation made by the user of the first badge relative to a user of the second badge comprises receiving a confirmation as to whether an action associated with the identified pinpoint was observed. Also, converting the electronic message received from the first badge into a pinpoint response associated with the second badge comprises associating the pinpoint response with the identified pinpoint.

The computer-implemented process 700 can also further comprise retrieving a pinpoint associated with the pinpoint response that was converted from the first message, and retrieving an event type associated with the retrieved pinpoint.

The computer-implemented process 700 can also optionally comprise receiving position information with respect to at least one of the first badge and the second badge, and utilizing the received position information to determine at least one of the event type and at least one pinpoint. For instance, receiving position information with respect to at least one of the first badge and the second badge can comprise receiving coordinates of at least one of the first badge and the second badge from an environmental based location tracking system. As another example, receiving position information with respect to at least one of the first badge and the second badge can comprise identifying the position of the second badge relative to the position of the first badge. As yet another example, receiving position information with respect to at least one of the first badge and the second badge can comprise identifying the position of the first badge, the second badge, or both based upon detection within the range of a third badge fixedly installed in a known location within the environment. The third badge can comprise a Bluetooth, ultra-wide band, or both, transceiver. Moreover, the computer-implemented process 700 can comprise obtaining at least one pinpoint based upon the third badge.

In certain example implementations, the computer-implemented process 700 further comprises using a reading from a direction or orientation sensor of the first badge to verify that the user of the first badge can properly observe the observation characterized in the electronic message. If it is judged that the user could not have observed the event, then the event record can be rejected (at the electronic badge itself, or at a server where the data is collected), or the electronic badge may refuse to input the pinpoint response entered by the corresponding user.

In yet further example implementations, the computer-implemented process 700 further comprises using a distance between the first badge and the second badge to verify that user of the first badge can properly observe the observation characterized in the electronic message. As anther example, the computer-implemented process can comprise using operational data electronically collected from a machine to designate or verify event type. For instance, using operational data can comprise collecting operational data from an industrial vehicle being operated by the user of the second badge.

The computer-implemented process 700 can still further comprise sending a message to the second badge to cause the second badge to convey feedback to the user of the second badge. For instance, sending a message to the second badge to cause the second badge to convey feedback to the user of the second badge can comprise informing the user of the second badge that an observation had occurred and feedback was given. Sending a message to the second badge to cause the second badge to convey feedback to the user of the second badge can also optionally comprise prompting the user of the second badge to review an instructional message displayed on a display screen of the second badge.

In optional configurations, the computer-implemented process 700 can comprise using at least one feature of the first badge to capture information associated with the observation, which is incorporated into the electronic message. For instance, using at least one feature of the first badge can comprise using at least one of, capturing an image using a camera, capturing a video, and recording data using a sensor.

The computer-implemented process 700 can still further comprise providing feedback from the first badge to the second badge. Feedback can come from or in response to the observation. Feedback can also be directly generated, or automatically generated based upon past data collected with regard to a geo-location, worker ID or other measurable data.

Referring to FIG. 8, a computer-implemented process 800 of tracking events, comprises detecting, at 802, by a first badge, the presence of a second badge that is within a wireless communication range of the first badge, thus designating an encounter. For instance, the first badge can detect the presence of a second badge using an ultra-wide band radio of the first badge to communicate with an ultra-wide band radio of the second badge, using a Bluetooth radio of the first badge to communicate with a Bluetooth radio of the second badge, or a combination thereof, e.g., by using both Bluetooth and ultra-wide band implement zones or ranges.

The computer implemented process also comprises performing, at 804, by processor executing instructions read out from memory, an event logging transaction in response to the encounter. Event logging is carried out by identifying, at 806, an event type associated with the second badge. For instance, identifying an event type associated with the second badge can comprise receiving from the second badge, at least one of an identifier associated with the user of the second badge, a badge identifier associated with the second badge, a task identifier associated with the second badge, a position of the second badge, and an event identifier associated with the second badge. Identifying an event type at 806 can also optionally comprise receiving from a positioning system, the location of the second badge, where the location of the second badge is derived from at least one of the relative position of the second badge relative to the first badge, or a coordinate location of the second badge, and using the location of the second badge to identify an event type. Identifying an event type at 806 can further optionally comprise extracting electronic metadata, the metadata corresponding to at least one of time read from an electronic clock, data extracted from a health and wellness database, information received from a task manager, and information received from a labor management system.

Event logging is further carried out by identifying, at 808, an electronic pinpoint that is linked to the identified event type, the identified pinpoint specifying an observable characteristic associated with the event type. For instance, the computer-implemented process 800 can also optionally comprise identifying an electronic pinpoint by identifying at least one pinpoint directed to a behavior-based characteristic of the user of the second badge.

Event logging is further carried out by outputting, at 810, a prompt to a user of the first badge that is associated with the identified electronic pinpoint, and receiving, at 812, by the first badge, from the user of the first badge, an electronic acknowledgement that a user of the second badge has engaged in an occurrence of the identified event type.

Event logging is still further carried out by receiving, at 814, by the first badge, from the user of the first badge, a response to the identified pinpoint. For instance, the computer-implemented process 800 can comprise receiving a voice command from the user of the first badge, and converting the voice command to an electronic response to the identified pinpoint.

The computer-implemented process 800 also comprises wirelessly communicating, at 816 an event record to a remote server, the event record comprising an identification of the event type, and the response to the pinpoint.

The computer-implemented process 800 can further comprise communicating a signal to the second badge that causes the second badge to output a notification to the user of the second badge that feedback was received. For instance, the received feedback can be responsive to a positive occurrence of an event, responsive to a negative occurrence of an event, etc. In some example configurations, the signal can be operatively configured to cause the second badge to queue up a microlearning instruction tied specifically to the response to the identified pinpoint.

The computer-implemented process 800 can optionally comprise modifying the event record to indicate that feedback was provided by the user of the first badge to the user of the second badge.

The computer-implemented process 800 can comprise transmitting the event record to the server in such a way that the user of the second badge remains anonymous, in such a way that the user of the first badge remains anonymous, or that both the user of the first badge and the second badge remain anonymous.

The computer-implemented process 800 can also further comprise receiving a signal indicating that the second badge is within a geo-zone, receiving a geo-record of electronically recorded events associated with the second badge within the geo-zone, and determining whether the user of the second badge engaged in a predetermined action associated with the event type based upon the response to the identified pinpoint and based upon the geo-record. In an example, the user of the second badge is operating a materials handling vehicle. As such, the computer-implemented process 800 further comprises receiving a signal indicating that the second badge is within a geo-zone by receiving a signal wirelessly communicated by the materials handling vehicle in response to the materials handling vehicle entering a designated geo-zone as detected by an environmental based location tracking system on the materials handling vehicle. The computer-implemented process 800 further comprises receiving a geo-record of electronically recorded events by receiving data collected by a processor on the materials handling vehicle in response to detecting that the materials handling vehicle is in a geo-zone.

The computer-implemented process 800 can further comprise outputting a prompt to a user of the first badge that is associated with the identified electronic pinpoint by presenting an opportunity to provide feedback at the discretion of the first user where a response is optional. As another example, the computer-implemented process can comprise outputting a prompt to a user of the first badge that is associated with the identified electronic pinpoint by evaluating at least one parameter associated with an operation to determine a priority for receiving feedback, and outputting the prompt if the evaluation exceeds a level associated with the determined priority.

Referring to FIG. 9, a computer-implemented process 900 of tracking events, comprises detecting, at 902, by a first badge, the presence of a second badge that is within a wireless communication range of the first badge. The computer-implemented process 900 also comprises performing, at 904, by processor executing on the first badge, an event logging transaction in response to detecting the presence of the second badge. The event logging transaction is carried out by identifying, at 906, an event type associated with the second badge, and identifying, at 910, an electronic pinpoint that is linked to the identified event type, where the identified pinpoint specifies an observable characteristic associated with the event type. The event logging transaction is further carried out by outputting, at 912, a prompt to a user of the first badge that is associated with the identified electronic pinpoint, and receiving, at 914, by the first badge, from the user of the first badge, an electronic acknowledgement that a user of the second badge has engaged in an occurrence of the identified event type. The event logging transaction further comprises receiving, at 916, by the first badge, from the user of the first badge, a response to the identified pinpoint, and wirelessly communicating, at 918, an event record to a remote server, the event record comprising an identification of the event type, and the response to the pinpoint.

Computer System Overview

Referring to FIG. 10, a schematic block diagram illustrates an exemplary computer system 1000 for implementing the various processes described herein. The exemplary computer system 1000 includes one or more (hardware) microprocessors (g) 1010 and corresponding (hardware) memory 1020 (e.g., random access memory and/or read only memory) that are connected to a system bus 1030. Information can be passed between the system bus 1030 (via a suitable bridge 1040) and a local bus 1050 that is used to communicate with various input/output devices. For instance, the local bus 1050 is used to interface peripherals with the one or more microprocessors (g) 1010, such as storage 1060 (e.g., hard disk drives); removable media storage devices 1070 (e.g., flash drives, DVD-ROM drives, CD-ROM drives, floppy drives, etc.); I/O devices 1080 such as input device (e.g., mouse, keyboard, scanner, etc.) output devices (e.g., monitor, printer, etc.); and a network adapter 1090. The above list of peripherals is presented by way of illustration, and is not intended to be limiting. Other peripheral devices may be suitably integrated into the computer system 1000.

The microprocessor(s) 1010 control operation of the exemplary computer system 1000. Moreover, one or more of the microprocessor(s) 1010 execute computer readable code (e.g., stored in the memory 1020, storage 1060, removable media insertable into the removable media storage 1070 or combinations thereof, collectively or individually referred to as computer-program products) that instructs the microprocessor(s) 1010 to implement the computer-implemented processes herein.

The computer-implemented processes herein may be implemented as a machine-executable process executed on a computer system, e.g., one or more of the processing devices 102, 126, etc., of FIG. 1, on a particular computing device such as the vehicle computer described with reference to FIG. 2, on the badges of FIGS. 3-4, or combination thereof.

Thus, the exemplary computer system or components thereof can implement processes and/or computer-implemented processes stored on one or more computer-readable storage devices as set out in greater detail herein. Other computer configurations may also implement the processes and/or computer-implemented processes stored on one or more computer-readable storage devices as set out in greater detail herein. Computer-program code for carrying out operations for aspects of the present disclosure may be written in any combination of one or more programming languages. The program code may execute entirely on the computer system 1000 or partly on the computer system 1000. In the latter scenario, the remote computer may be connected to the computer system 1000 through any type of network connection, e.g., using the network adapter 1090 of the computer system 1000.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable signal medium is a transitory propagating signal per se. A computer-readable signal medium may include computer readable program code embodied therein, for example, as a propagated data signal in baseband or as part of a carrier wave. More specifically, a computer-readable signal medium does not encompass a computer-readable storage medium.

A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random-access memory (RAM), a read-only memory (ROM), an erasable programmable read-only memory (EPROM), Flash memory, a portable computer storage device, an optical storage device such as a compact disc read-only memory (CD-ROM) or digital video disk (DVD), or any suitable combination of the foregoing. In particular, a computer-readable storage medium includes computer-readable hardware such as a computer-readable storage device, e.g., memory. Here, a computer-readable storage device and computer-readable hardware are physical, tangible implementations that are non-transitory.

By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by overwriting, deleting, modifying, etc.

Moreover, since hardware comprises physical element(s) or component(s) of a corresponding computer system, hardware does not encompass software, per se.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure.

Having thus described the invention of the present application in detail and by reference to embodiments thereof, it will be apparent that modifications and variations are possible without departing from the scope of the invention defined in the appended claims.

What is claimed is:

1. A computer-implemented process of tracking events, comprising:
   detecting, by a first electronic badge, the presence of a second electronic badge that is within a limited wireless communication range of the first electronic badge, thus designating an encounter;
   performing, by processor executing instructions read out from memory, an event logging transaction in response to the encounter by:
      identifying an event type associated with the second electronic badge;
      identifying an electronic pinpoint that is linked to the identified event type, the identified pinpoint specifying a characteristic observable by a user of the first electronic badge that is associated with the event type;
      outputting a prompt to the user of the first electronic badge that is associated with the identified electronic pinpoint;
      receiving, by the first electronic badge, from the user of the first electronic badge, an electronic acknowledgement that a user of the second electronic badge has engaged in an occurrence of the identified event type based upon an observation;
      receiving, by the first electronic badge, from the user of the first electronic badge, a response to the identified pinpoint; and
      wirelessly communicating an event record to a remote server, the event record comprising an identification of the event type, and the response to the pinpoint.

2. The computer-implemented process of claim 1, wherein:
   detecting, by a first electronic badge, the presence of a second electronic badge that is within a limited wireless communication range of the first electronic badge comprises:
      using an ultra-wide band radio of the first electronic badge to communicate with an ultra-wide band radio of the second electronic badge, using a Bluetooth radio of the first electronic badge to communicate with a Bluetooth radio of the second electronic badge, or a combination thereof.

3. The computer-implemented process of claim 1, wherein:
   identifying an event type associated with the second electronic badge comprises at least one of:
      receiving from the second electronic badge, at least one of:
         an identifier associated with the user of the second electronic badge;
         an electronic badge identifier associated with the second electronic badge;
         a task identifier associated with the second electronic badge;
         a position of the second electronic badge; and
         an event identifier associated with the second electronic badge.

4. The computer-implemented process of claim 1, wherein:
   identifying an event type associated with the second electronic badge comprises:
      receiving from a positioning system, the location of the second electronic badge, where the location of the second electronic badge is derived from at least one of the relative position of the second electronic badge relative to the first electronic badge, or a coordinate location of the second electronic badge; and
      using the location of the second electronic badge to identify an event type.

5. The computer-implemented process of claim 4 further comprising:
   queuing up a microlearning instruction tied specifically to the response to the identified pinpoint.

6. The computer-implemented process of claim 4 further comprising:
   transmitting the event record to the server in such a way that the user of the second electronic badge remains anonymous, the user of the first electronic badge remains anonymous, or both users remain anonymous.

7. The computer-implemented process of claim 1, wherein:
   identifying an event type associated with the second electronic badge comprises:
      extracting electronic metadata, the metadata corresponding to at least one of time read from an electronic clock, data extracted from a health and wellness database, information received from a task manager, and information received from a labor management system; and
      using the extracted electronic metadata to identify an event type.

8. The computer-implemented process of claim 1 further comprising:
   communicating a signal to the second electronic badge that causes the second electronic badge to output a notification to the user of the second electronic badge that feedback was received.

9. The computer-implemented process of claim 1, wherein:
outputting a prompt to a user of the first electronic badge that is associated with the identified electronic pinpoint comprises:
evaluating at least one parameter associated with an operation to determine a priority for receiving feedback; and
outputting the prompt if the evaluation exceeds a level associated with the determined priority.

10. A computer-implemented process of tracking events, comprising:
detecting, by a first electronic badge, the presence of a second electronic badge that is within a wireless communication range of the first electronic badge;
performing, by processor executing on the first electronic badge, an event logging transaction in response to detecting the presence of the second electronic badge by:
identifying an event type associated with the second electronic badge by receiving a geo-record of electronically recorded events associated with the second electronic badge within a corresponding geo-zone and selecting an electronically recorded event as the event type;
identifying an electronic pinpoint that is linked to the identified event type based upon the geo-record, the identified pinpoint specifying an observable characteristic associated with the event type;
outputting a prompt to a user of the first electronic badge that is associated with the identified electronic pinpoint;
receiving, by the first electronic badge, from the user of the first electronic badge, an electronic acknowledgement that a user of the second electronic badge has engaged in an occurrence of the identified event type based upon observation;
receiving, by the first electronic badge, from the user of the first electronic badge, a response to the identified pinpoint;
wirelessly transmitting a message to the second electronic badge indicating that an observation was made; and
wirelessly communicating an event record to a remote server, the event record comprising an identification of the event type, and the response to the pinpoint.

* * * * *

UNITED STATES PATENT AND TRADEMARK OFFICE
CERTIFICATE OF CORRECTION

Page 1 of 1

PATENT NO. : 10,664,809 B2
APPLICATION NO. : 16/544014
DATED : May 26, 2020
INVENTOR(S) : Philip W. Swift It is certified that error appears in the above-identified patent and that said Letters Patent is hereby corrected as shown below:

In the Specification

Column 25, Line 48, "microprocessors (g) 1010 and corresponding" should read -- microprocessors (µP) 1010 and corresponding --
Column 25, Line 55, "with the one or more microprocessors (g) 1010, such as" should read -- with the one or more microprocessors (µP) 1010, such as --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*